(12) United States Patent
Anisimovich et al.

(10) Patent No.: US 8,078,450 B2
(45) Date of Patent: *Dec. 13, 2011

(54) METHOD AND SYSTEM FOR ANALYZING VARIOUS LANGUAGES AND CONSTRUCTING LANGUAGE-INDEPENDENT SEMANTIC STRUCTURES

(75) Inventors: Konstantin Anisimovich, Moscow (RU); Vladimir Selegey, Moscow (RU); Konstantin Zuev, Moscow (RU)

(73) Assignee: Abbyy Software Ltd., Nicosia (CY)

( * ) Notice: Subject to any disclaimer, the term of this patent is extended or adjusted under 35 U.S.C. 154(b) by 727 days.

This patent is subject to a terminal disclaimer.

(21) Appl. No.: 11/548,214

(22) Filed: Oct. 10, 2006

(65) Prior Publication Data
US 2008/0091405 A1    Apr. 17, 2008

(51) Int. Cl.
G06F 17/27    (2006.01)
(52) U.S. Cl. .......... 704/9; 704/2; 704/4; 704/8; 704/277
(58) Field of Classification Search ................ 704/1–10, 704/277
See application file for complete search history.

(56) References Cited

U.S. PATENT DOCUMENTS

| | | | |
|---|---|---|---|
| 5,426,583 A * | 6/1995 | Uribe-Echebarria Diaz De Mendibil | 704/2 |
| 5,677,835 A * | 10/1997 | Carbonell et al. | 704/8 |
| 5,715,468 A * | 2/1998 | Budzinski | 704/9 |
| 5,768,603 A | 6/1998 | Brown et al. | |
| 5,794,050 A * | 8/1998 | Dahlgren et al. | 717/144 |
| 5,826,219 A | 10/1998 | Kutsumi | |
| 5,884,247 A | 3/1999 | Christy | |
| 6,233,544 B1 | 5/2001 | Alshawi | |
| 6,243,670 B1 | 6/2001 | Bessho et al. | |
| 6,275,789 B1 | 8/2001 | Moser et al. | |
| 6,356,864 B1 | 3/2002 | Foltz et al. | |
| 6,463,404 B1 | 10/2002 | Appleby | |
| 6,622,123 B1 * | 9/2003 | Chanod et al. | 704/277 |
| 6,778,949 B2 | 8/2004 | Duan et al. | |
| 6,871,199 B1 | 3/2005 | Binnig et al. | |
| 6,901,402 B1 | 5/2005 | Corston-Oliver et al. | |
| 6,928,448 B1 | 8/2005 | Franz et al. | |
| 6,937,974 B1 | 8/2005 | d'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 7,475,015 B2 * | 1/2009 | Epstein et al. | 704/257 |
| 7,739,102 B2 * | 6/2010 | Bender | 704/9 |
| 2003/0176999 A1 | 9/2003 | Calcagno et al. | |
| 2005/0155017 A1 | 7/2005 | Bertis et al. | |

(Continued)

OTHER PUBLICATIONS

Hutchins, Machine Translation: Past, Present, Future, Ellis Horwood, Ltd., Chichester, UK, 1986.*

(Continued)

*Primary Examiner* — Talivaldis Ivars Smits
*Assistant Examiner* — Shaun Roberts
(74) *Attorney, Agent, or Firm* — John C Meline

(57) ABSTRACT

A method and computer system for analyzing sentences of various languages and constructing a language-independent semantic structure are provided. On the basis of comprehensive knowledge about languages and semantics, exhaustive linguistic descriptions are created, and lexical, morphological, syntactic, and semantic analyses for one or more sentences of a natural or artificial language are performed. A computer system is also provided to implement, analyze and store various linguistic structures and to perform lexical, morphological, syntactic, and semantic analyses. As result, a generalized data structure, such as a semantic structure, is generated and used to describe the meaning of one or more sentences in language-independent form, applicable to automated abstracting, machine translation, control systems, Internet information retrieval, etc.

19 Claims, 27 Drawing Sheets

U.S. PATENT DOCUMENTS

2005/0209844 A1    9/2005    Wu et al.

OTHER PUBLICATIONS

Bolshakov, I.A. "Co-Ordinative Ellipsis in Russian Texts: Problems of Description and Restoration" Proceedings of the 12th conference on Computational linguistics—vol. 1, pp. 65-67. Association for Computational Linguistics 1988.*

Mitamura, T et al. "An Efficient Interlingua Translation System for Multi-lingual Document Production," Proceedings of Machine Translation Summitt III, Washington DC, Jul. 2-4, 1991.*

* cited by examiner

METHOD AND SYSTEM FOR ANALYZING VARIOUS LANGUAGES AND CONSTRUCTING LANGUAGE-INDEPENDENT SEMANTIC STRUCTURES

BACKGROUND OF THE INVENTION

1. Field of the Invention

Embodiments of the invention generally relate to automated recognition of the meanings of natural-language sentences and language translation.

2. Description of the Related Art

The acquired ability to understand, speak, and write one or more languages is an integral part of human development to interact and communicate within a society. Various language analysis approaches have been used to dissect a given language, analyze its linguistic structure in order to understand the meanings of a word, a sentence in the given language, extract information from the word, the sentence, and, if necessary, translate into another language.

Prior language analysis systems with a semantic component usually are created for a very restricted area of application, for example, medical diagnostics or ticket sales/reservation. In these analysis systems, only simple sentence patterns with restricted syntax and semantics are used. In addition, syntactic descriptions in general are not linked with the semantic descriptions. Other machine translation systems, both rule-based and statistics-based, concentrate on proper transfer of language information and usually make no use of any full-fledged intermediary data structures which explicate the meaning of the sentence being translated.

Certain theoretical concepts, such as Parallel Correspondence Model, propose the idea of uniting and linking syntactical information with semantic information together. For example, the most developed of these theoretical concepts are Generalized Phrase Structure Grammar (GPSG), Head-Driven Phrase Structure Grammar (HPSG), and Lexical Function Grammar. However, most of them have not been put into usable algorithms for language analysis.

As a result, even though various models have been proposed, most of them perform poorly in analyzing complete sentences experimentally and do not have any noteworthy industrial application. In addition, complex sentences are often very long and contain various punctuation and symbols such that prior art parsers, language analysis programs, or machine translation systems often have difficulty returning a complete parse or translation on sentences beyond a certain level of complexity. It is especially true for complex texts, such as those found in technical texts, documentation, internet articles, journals, and the likes.

Further, the decision to remove ambiguous results or defer such actions during different stages of the language analysis and/or machine translation often complicates the analysis and translation itself, leading to a very low percentage of successful cases. Attempts to successfully analyze one language sentence and synthesize into another language all have the drawbacks of being very time-consuming and/or compatible or applicable only to specific languages.

Thus, there exists a need to analyze a sentence of a given language and construct a language independent structure/description so as to understand the meanings of the sentence and/or translate into another language.

SUMMARY OF THE INVENTION

Embodiments of the invention generally relate to methods, computer-readable media, devices and systems to analyze a sentence or an expression in a language. In one embodiment, a sentence from a given language is analyzed by applying the methods, rules, and algorithms provided herein, and a language independent semantic structure for a sentence from a given language is generated. In another embodiment, a first sentence from a first language is translated into a second sentence in a second language using the language independent semantic structure.

In one aspect, a method of analyzing a sentence or an expression of a language includes performing a lexical analysis of the sentence, performing a lexical-morphological analysis of the sentence, and building a lexical-morphological structure of the sentence. The method further includes performing a rough syntactic analysis on the lexical-morphological structure of the sentence, generating a graph of generalized constituents from the lexical-morphological structure of the sentence, performing a precise syntactic analysis on the basis of the graph of the generalized constituents, and generating one or more syntactic trees from the graph of the generalized constituents. Then non-tree links are established for the best syntactic tree, and a best syntactic structure is obtained. A language-independent semantic structure for the sentence of the language is then generated after performing a semantic analysis on the best syntactic structure.

In another aspect, a method of analyzing a sentence or expression in a source language includes performing a lexical analysis of the sentence in the source language, performing a lexical-morphological analysis on the each element of the sentence, and building a lexical-morphological structure for the whole sentence, performing a rough syntactic analysis on the lexical-morphological structure of the sentence using one or more lexical descriptions, one or more semantic descriptions, and one or more syntactic descriptions, building a set of all possible constituents for each element of the sentence, and building a graph of the generalized constituents bottom up from the lexical-morphological structure of the sentence.

The method further includes performing a precise syntactic analysis on the graph of the generalized constituents and generating a graph of precise constituents, generating one or more syntactic trees from the graph of the precise constituents, establishing non-tree links on the one or more syntactic trees, generating one or more syntactic structure variants and selecting a best syntactic structure from the one or more syntactic structure variants, performing a semantic analysis on the best syntactic structure of the sentence, and generating a language-independent semantic structure for the sentence of the language. The method further includes performing filtering of the constituents prior to and after building the graph of the generalized constituents. In addition, building the graph of the generalized constituents may include performing coordination processing and ellipsis restoration. Further, performing the precise syntactic analysis may include generating a graph of precise constituents and rating the one or more precise constituents based on a plurality of rating scores independently obtained and calculated. The rating scores includes, but not limited to, the rating scores of one or more lexical meanings for each element of the sentence, the rating scores of one or more individual syntactic constructions (e.g., idioms, collocations, etc.) for each element of the sentence, the rating scores of the degree of correspondence of the precise constituents to their semantic descriptions, and the rating scores of the linear order. Then, the rating scores are used to generate one or more syntactic trees as hypotheses about the overall syntactic structure of the sentence. One or more best syntactic trees with the highest rating score are selected. The precise syntactic analysis may further include establishing non-tree links on the one or more best syntactic trees to generate one or more syntactic structures with non-tree links and selecting a best syntactic structure with established non-tree links.

In one embodiment, a computer-readable medium is provided, comprising instructions for causing a computing system to carry out steps including performing a lexical analysis of the sentence in the source language, performing a lexical-morphological analysis on the each element of the sentence and building a lexical-morphological structure for the whole sentence, performing a rough syntactic analysis on the lexical-morphological structure of the sentence and generating a graph of generalized constituents from the lexical-morphological structure of the sentence, performing a precise syntactic analysis on the graph of the generalized constituents and generating one or more syntactic structures for the sentence from the graph of the generalized constituents, performing a semantic analysis on the syntactic structures of the sentence and generating a language-independent semantic structure for the sentence of the language.

In still another embodiment, the invention provides a device and/or a computer system adapted to analyze a sentence of a language. The computer system may include a lexical-morphological analyzer, a rough syntactic analyzer, a precise syntactic analyzer, and a semantic analyzer. The lexical-morphological analyzer is adapted to perform a lexical analysis and a lexical-morphological analysis on each element of the sentence and generating a lexical-morphological structure of the sentence. The rough syntactic analyzer is adapted to perform a rough syntactic analysis on the lexical-morphological structure of the sentence and generate a graph of generalized constituents from the lexical-morphological structure of the sentence. The precise syntactic analyzer is adapted to perform a precise syntactic analysis on the graph of the generalized constituents and generate a syntactic structure of the sentence from the graph of the generalized constituents. The semantic analyzer is adapted to perform a semantic analysis on the syntactic structure of the sentence and generate a language-independent semantic structure for the sentence of the language.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
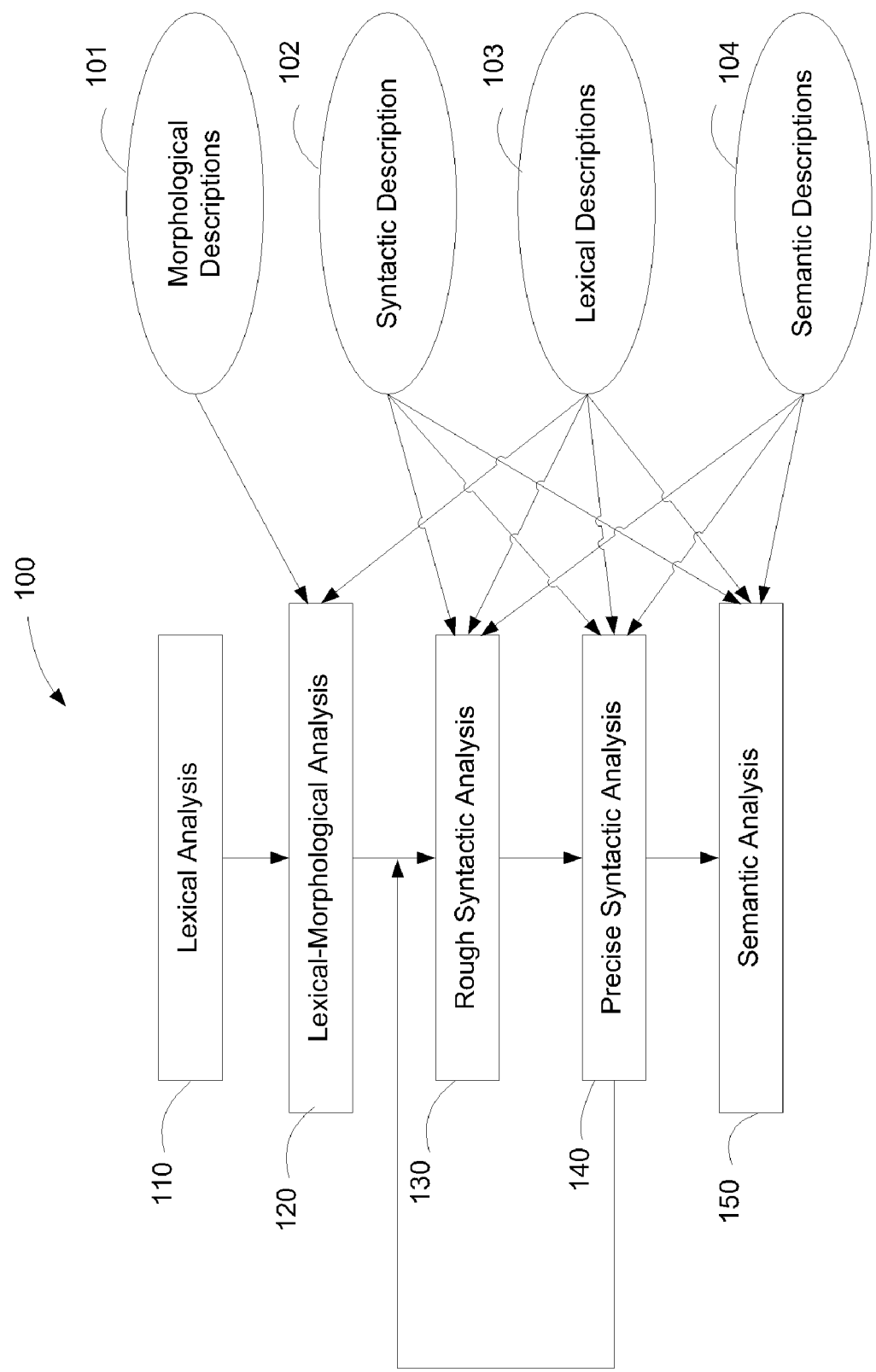
FIG. 1 is a flow diagram of a method according to one or more embodiments of the invention.

Embodiments of the invention provide methods, computer-readable media, and language analysis computer systems to efficiently and completely generate surface syntactical structures for a given input/source language and transition into language-independent, universal semantic concepts and structures which are not limited by the syntax and other language barriers of the input language. Using exhaustive linguistic descriptions, language and semantic models and a corresponding method were developed to recognize and analyze the meanings of sentences of a given language through reliable handling of syntactical and semantic ambiguities which may appear during the transition. Unlike other systems where semantic structures are built as the final or interim result of language processing, embodiments of the invention achieve its aims by maximal use of linguistic knowledge to generate the resulting semantic structure which contains a large amount of various data information about the meaning of a sentence.

One feature according to embodiments of the invention is the integral use of language descriptions to analyze initial text sentences and join syntactical and semantic foundations into common concept structures. This approach is provided to analyze semantics at the earliest stages of syntactical analysis. Unlike prior research in this field, an efficient technology is provided herein to transition from surface syntactical structures in different languages into language-independent semantic structures and does not limit the input language's syntax. Thus, a semantic model is developed to be suitable for building the semantic structures and reliably handle syntactical and semantic ambiguities present during the transition. Since linguistic knowledge is taken into consideration to a greater extent than any known art, all the information and meanings conveyed by a given sentence in a language are truly and faithfully represented by the resulting semantic structure generated herein.

In addition, the natural language descriptions used herein attempt to cover all of language phenomena manifested in written discourse as completely and exhaustively as possible. In one aspect, the linguistic descriptions and algorithms used herein may be employed as exhaustively and comprehensively as possible to make it possible to construct a most probable and most suitable semantic structure for any written sentences from any source languages within an acceptable period of time.

Embodiments of the invention include methods and means for constructing a model of any natural language, which includes creation of the required language descriptions as described herein; for describing a language-independent semantic structure which conveys the meanings of source sentences in any natural language; for transforming sentences in a natural language into their semantic structures, among others. Computer readable media, language analysis computer systems, instructions, algorithms, and means for carrying out various methods are also provided herein. An environment for a user to monitor various analysis processes is also provided herein. For example, embodiments of the invention may include a method being implemented in various forms, formats, or algorithms and adapted to be operated on a computer-readable medium, a computer program, or a device for analyzing a sentence of a source language and generating a language-independent semantic structure.

FIG. 1 illustrates a method 100 for transforming a sentence from a source language into its semantic structure according to an exemplary embodiment of the invention. The method 100 for analyzing a sentence of a source/input language includes using linguistic descriptions adapted to perform various analyses. The linguistic descriptions may include morphological descriptions 101, syntactic descriptions 102, lexical descriptions 103, and semantic descriptions 104.

Initially, a lexical analysis 110 is performed on the sentence in the source/input language. A lexical-morphological analysis 120 which utilizes the morphological descriptions 101 and the lexical descriptions 103 is also performed on the sentence to generate a lexical morphological structure of the sentence. In addition, a syntactic analysis including a rough syntactic analysis 130 and a precise syntactic analysis 140 is performed to generate a syntactic structure of the sentence. Performing the rough syntactic analysis and the precise syntactic analysis may require the use of the syntactical descriptions 102, the lexical descriptions 103, and the semantic descriptions 104. The precise syntactic analysis may be performed repeatedly if the syntactic structure is not successfully built.

Then, a semantic analysis 150 is performed to transition the syntactic structure of the source sentence in the natural language into a language-independent semantic structure. The resulting semantic structure fully conveys the meaning of the source sentence in the source natural language but represents the source sentence in a language-independent form.

Figure 2:
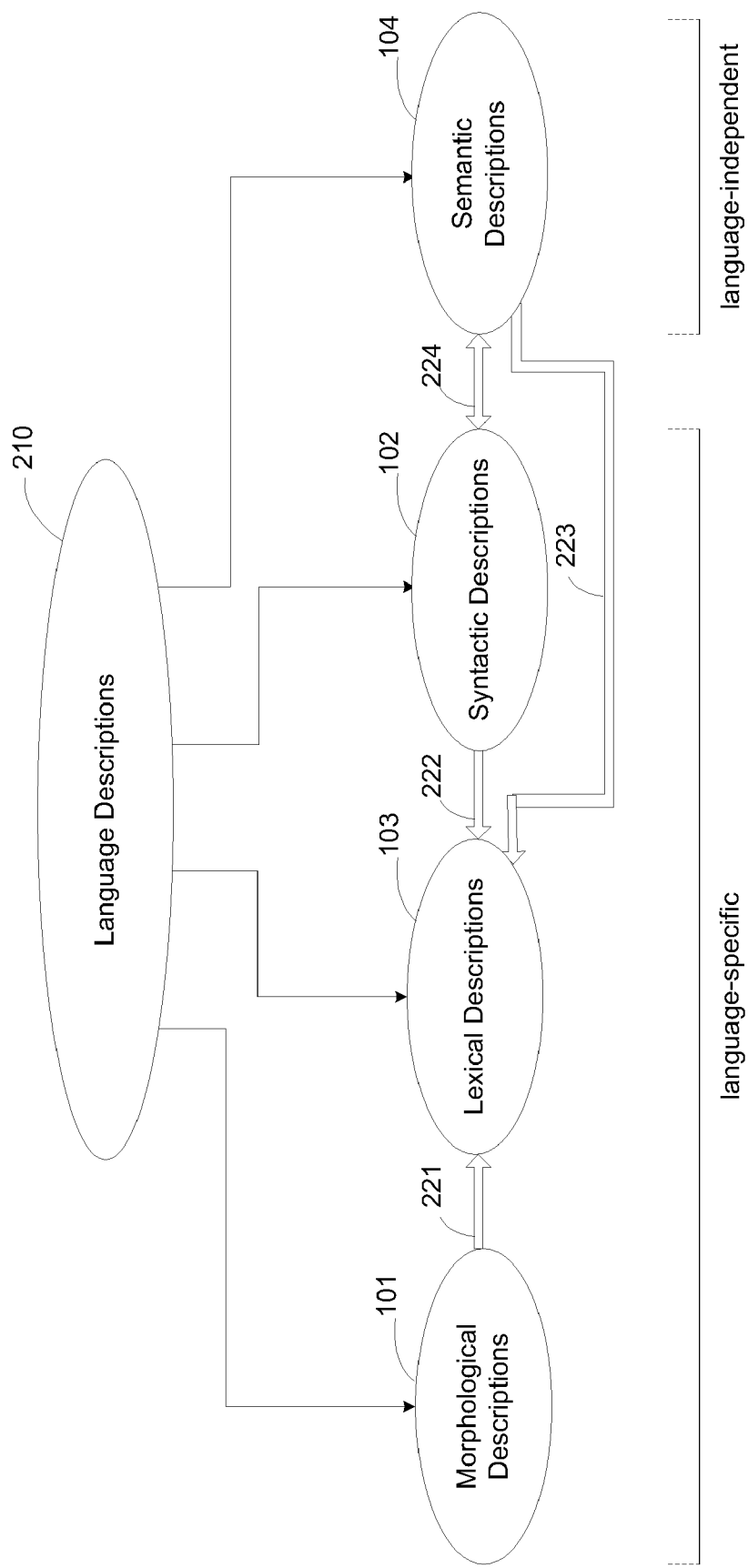
FIG. 2 is a diagram illustrating language descriptions according to one exemplary embodiment of the invention.

FIG. 2 illustrates language descriptions 210 including morphological descriptions 101, lexical descriptions 103, syntactic descriptions 102, and semantic descriptions 104, and their relationship thereof. Among them, the morphological descriptions 101, the lexical descriptions 103, and the syntactic descriptions 102 are language-specific. Each of these language descriptions 210 can be created for each source language, and taken together, they represent a model of the source language. The semantic descriptions 104, however, are language-independent and are used to describe language-independent semantic features of various languages and to construct language-independent semantic structures.

As shown in FIG. 2, the morphological descriptions 101, the lexical descriptions 103, the syntactic descriptions 102, and the semantic descriptions 104 are related. Lexical descriptions 104 and morphological descriptions 101 are related by a link 221 because a specified lexical meaning in the lexical description 230 may have a morphological model represented as one or more grammatical values for the specified lexical meaning. For example, one or more grammatical values can be represented by different sets of grammemes in a grammatical system of the morphological descriptions 101.

In addition, as shown by a link 222, a given lexical meaning in the lexical descriptions 103 may also have one or more surface models corresponding to the syntactic descriptions 102 for the given lexical meaning. As represented by a link 223, the lexical descriptions 103 can be connected with the semantic descriptions 104. Therefore, the lexical descriptions 103 and the semantic descriptions 104 may be combined into "lexical-semantic descriptions", such as a lexical-semantic dictionary.

As shown by a link 224, the syntactic descriptions 240 and the semantic descriptions 104 are also related. For examples, diatheses 417 of the syntactic descriptions 102 can be considered as the "interface" between the language-specific surface models and the language-independent deep models 512 of the semantic description 104.

Figure 3:
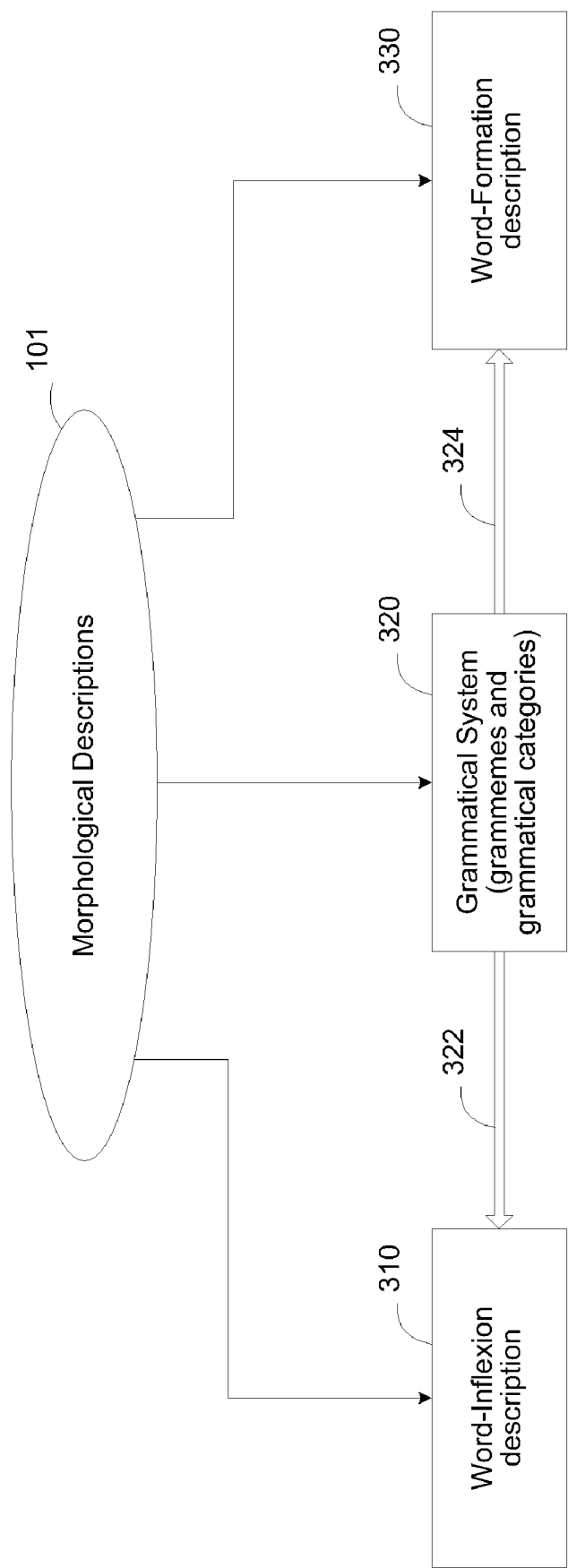
FIG. 3 is a diagram illustrating morphological descriptions according to one exemplary embodiment of the invention.

FIG. 3 illustrates exemplary morphological descriptions. The components of the morphological descriptions 101 include, but are not limited to, word-inflexion description 310, grammatical system 320 (e.g., grammemes), and word-formation description 330, among others. The grammatical system 320 is a set of grammatical categories, such as, "Part of speech", "Case", "Gender", "Number", "Person", "Reflexivity", "Tense", "Aspect", etc., and their meanings, hereafter referred to as "grammemes", including, for example, Adjective, Noun, Verb, etc.; Nominative, Accusative, Genitive, etc.; Feminine, Masculine, Neuter, etc.; and more.

The word-inflexion description 310 describes how the main word form may change according to its case, gender, number, tense, etc. and broadly includes or describes all possible forms for this word. The word-formation 330 describes which new words may be generated involving this word (for example, there are a lot of compound words in German). The grammemes are units of the grammatical systems 320 and, as shown by a link 322 and a link 324 in FIG. 3, the grammemes can be utilized to build the word-inflexion description 310 and the word-formation description 330.

According to one aspect of the invention, when establishing syntactic relationships for elements of the source sentence, a constituent model is used. A constituent may include a contiguous group of words in a sentence and behaves as one entity. A constituent has a word at its core and can include child constituents at lower levels. A child constituent is a dependent constituent and may be attached to other constituents (as parent constituents) for building the syntactic descriptions 102 of the source sentence.

Figure 4:
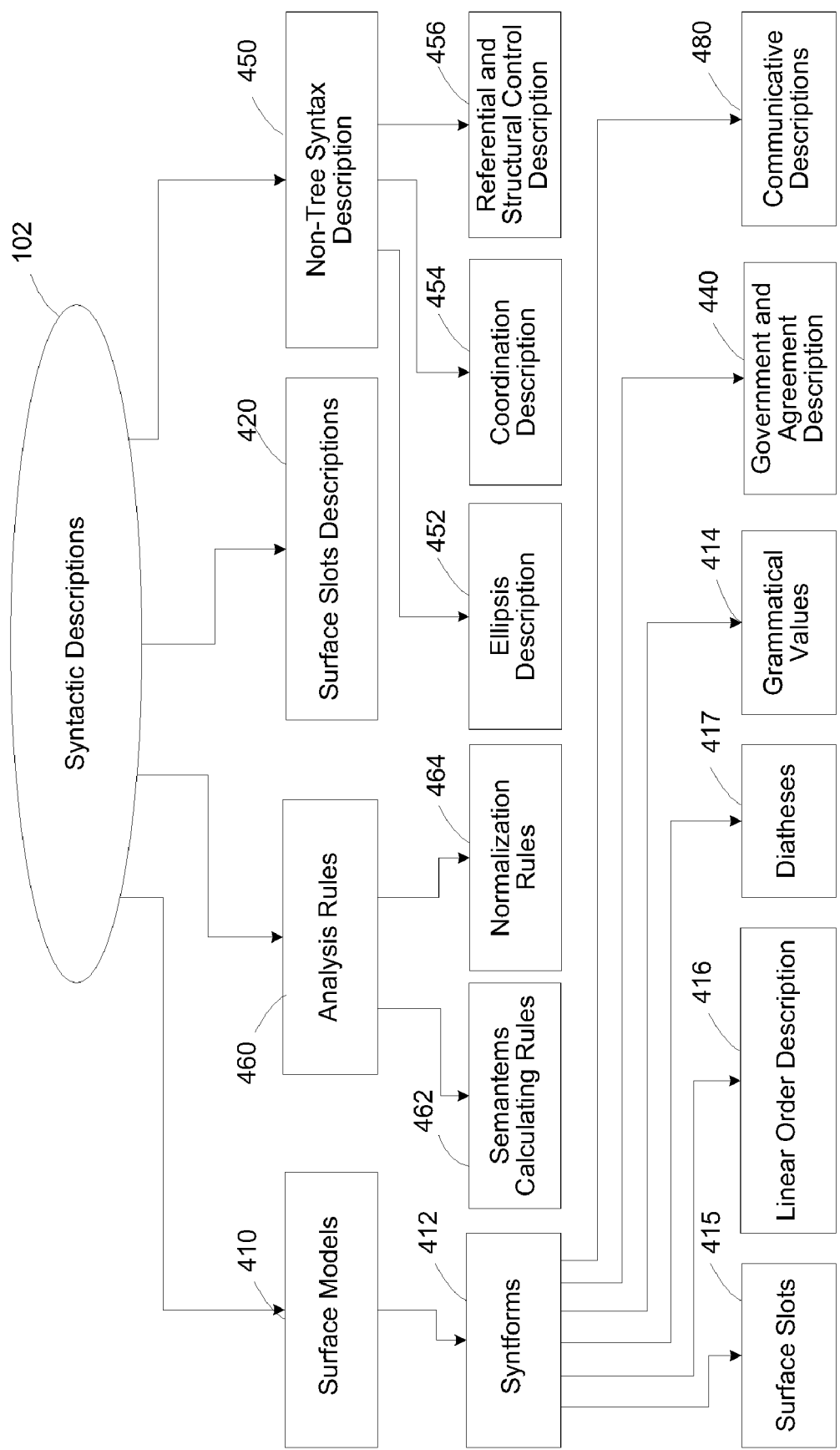
FIG. 4 is a diagram illustrating syntactic descriptions according to one exemplary embodiment of the invention.

FIG. 4 illustrates exemplary syntactic descriptions. The components of the syntactic descriptions 102 may include, but are not limited to, surface models 410, surface slot descriptions 420, referential and structural control description 430, government and agreement description 440, non-tree syntax description 450, and analysis rules 460. The syntactic descriptions 102 are used to construct possible syntactic structures of a source sentence from a given source language, taking into account free linear word order, non-tree syntactic phenomena (e.g., coordination, ellipsis, etc.), referential relationships, and other considerations.

The surface models 410 are represented as aggregates of one or more syntactic forms ("syntforms" 412) in order to describe possible syntactic structures of sentences as included in the syntactic description 102. In general, the lexical meaning of a language is linked to their surface (syntactic) models 410, which represent constituents which are possible when the lexical meaning functions as a "core" and includes a set of surface slots of child elements, a description of the linear order, diatheses, among others.

The surface models 410 as represented by syntforms 412. Each syntform 412 may include a certain lexical meaning which functions as a "core" and may further include a set of surface slots 415 of its child constituents, a linear order description 416, diatheses 417, grammatical values 414, government and agreement descriptions 440, communicative descriptions 480, among others, in relationship to the core of the constituent.

The surface slot descriptions 420 as a part of syntactic descriptions 102 are used to describe the general properties of the surface slots 415 that used in the surface models 410 of various lexical meanings in the source language. The surface slots 415 are used to express syntactic relationships between the constituents of the sentence. Examples of the surface slot 415 may include "subject", "object_direct", "object indirect", "relative clause", among others.

Figure 5:
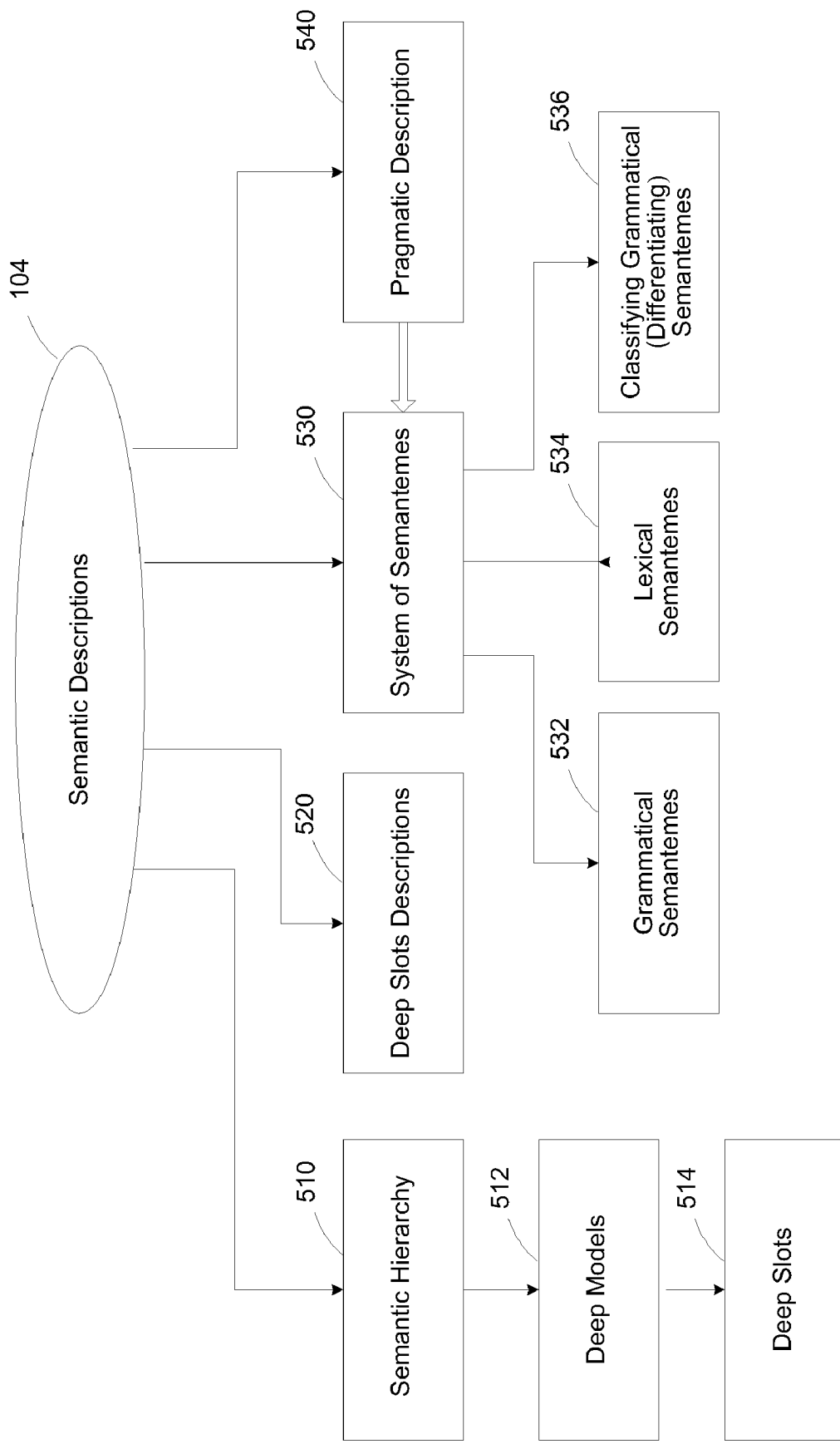
FIG. 5 is a diagram illustrating semantic descriptions according to one exemplary embodiment of the invention.

During the syntactic analysis, the constituent model utilizes a plurality of the surface slots 415 of the child constituents and their linear order descriptions 416 and describes the grammatical values 414 of the possible fillers of these surface slots 415. The diatheses 417 represent correspondences between the surface slots 415 and deep slots 514 (as shown in FIG. 5). The diatheses 417 are represented by the link 224 between syntactic descriptions 102 and semantic descriptions 104. The communicative descriptions 480 describe communicative order in a sentence.

The syntactic forms, syntforms 412, are a set of the surface slots 415 coupled with the linear order descriptions 416. One or more constituents possible for a lexical meaning of a word form of a source sentence may be represented by surface syntactic models, such as the surface models 410. Every constituent is viewed as the realization of the constituent model by means of selecting a corresponding syntform 412. The selected syntactic forms, the syntforms 412, are sets of the surface slots 415 with a specified linear order. Every surface slot in a syntform can have grammatical and semantic restrictions on their fillers.

The linear order description 416 is represented as linear order expressions which are built to express a sequence in which various surface slots 415 can occur in the sentence. The linear order expressions may include names of variables, names of surface slots, parenthesis, grammemes, ratings, and the "or" operator, etc. For example, a linear order description for a simple sentence of "Boys play football". may be represented as "Subject Core Object_Direct", where "Subject, Object_Direct" are names of surface slots 415 corresponding to the word order. Fillers of the surface slots 415 indicated by symbols of entities of the sentence are present in the same order for the entities in the linear order expressions.

Different surface slots 415 may be in a strict and/or variable relationship in the syntform 412. For example, parenthesis may be used to build the linear order expressions and describe strict linear order relationships between different surface slots 415. SurfaceSlot1 SurfaceSlot2 or (SurfaceSlot1 SurfaceSlot2) means that both surface slots are located in the same linear order expression, but only one order of these surface slots relative to each other is possible such that SurfaceSlot2 follows after SurfaceSlot1.

As another example, square brackets may be used to build the linear order expressions and describe variable linear order relationships between different surface slots 415 of the syntform 412. As such, [SurfaceSlot1 SurfaceSlot2] indicates that both surface slots belong to the same variable of the linear order and their order relative to each other is not relevant.

The linear order expressions fro the linear order description 416 may contain grammatical values 414, expressed by grammemes, to which child constituents correspond. In addition, two linear order expressions can be joined by the operator|(<<OR>>). For example: (Subject Core Object)|[Subject Core Object].

The communicative descriptions 480 describe a word order in the syntform 412 from the point of view of communicative acts to be represented as communicative order expressions, which are similar to linear order expressions. The government and agreement description 440 contains rules and restrictions on grammatical values of attached constituents which are used during syntactic analysis.

The non-tree syntax descriptions 450 are related to processing various linguistic phenomena, such as, ellipsis and coordination, and are used in syntactic structures transformations which are generated during various steps of analysis according to embodiments of the invention. The non-tree syntax descriptions 450 include ellipsis description 452, coordination description 454, as well as, referential and structural control description 430, among others.

The analysis rules 460 as a part of the syntactic descriptions 102 may include, but not limited to, semantemes calculating rules 462 and normalization rules 464. Although analysis rules 460 are used during the step of semantic analysis 150, the analysis rules 460 generally describe properties of a specific language and are related to the syntactic descriptions 102. The normalization rules 464 are generally used as transformational rules to describe transformations of semantic structures which may be different in various languages.

FIG. 5 illustrates exemplary semantic descriptions. The components of the semantic structures 104 are language-independent and may include, but are not limited to, a semantic hierarchy 510, deep slots descriptions 520, a system of semantemes 530, and pragmatic descriptions 540.

The semantic hierarchy 510 are comprised of semantic notions (semantic entities) and named semantic classes arranged into hierarchical parent-child relationships similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Each semantic class in the semantic hierarchy 510 is supplied with a deep model 512. The deep model 512 of the semantic class is a set of the deep slots 514, which reflect the semantic roles of child constituents in various sentences with objects of the semantic class as the core of a parent constituent and the possible semantic classes as fillers of deep slots. The deep slots 514 express semantic relationships, including, for example, "agent", "addressee", "instrument", "quantity", etc. A child semantic class inherits and adjusts the deep model 512 of its direct parent semantic class The deep slots descriptions 520 are used to describe the general properties of the deep slots 514 and reflect the semantic roles of child constituents in the deep models 512. The deep slots descriptions 520 also contain grammatical and semantic restrictions of the fillers of the deep slots 514. The properties and restrictions for the deep slots 514 and their possible fillers are very similar and often times identical among different languages. Thus, the deep slots 514 are language-independent.

The system of semantemes 530 represents a set of semantic categories and semantemes, which represent the meanings of the semantic categories. As an example, a semantic category, "DegreeOfComparison", can be used to describe the degree of comparison and its semantemes may be, for example, "Positive", "ComparativeHigherDegree", "SuperlativeHighestDegree", among others. As another example, a semantic category, "RelationToReferencePoint", can be used to describe an order as before or after a reference point and its semantemes may be, "Previous", "Subsequent", respectively, and the order may be spatial or temporal in a broad sense of the words being analyzed. As yet another example, a semantic category, "EvaluationObjective", can be used to describe an objective assessment, such as "Bad", "Good", etc.

The systems of semantemes 530 include language-independent semantic attributes which express not only semantic characteristics but also stylistic, pragmatic and communicative characteristics. Some semantemes can be used to express an atomic meaning which finds a regular grammatical and/or lexical expression in a language. By their purpose and usage, the system of semantemes 530 may be divided into various kinds, including, but not limited to, grammatical semantemes 532, lexical semantemes 534, and classifying grammatical (differentiating) semantemes 536.

The grammatical semantemes 532 are used to describe grammatical properties of constituents when transforming a syntactic tree into a semantic structure. The lexical semantemes 534 describe specific properties of objects (for example, "being flat" or "being liquid") and are used in the deep slot descriptions 520 as restriction for deep slot fillers (for example, for the verbs "face (with)" and "flood", respectively). The classifying grammatical (differentiating) semantemes 536 express the differentiating properties of objects within a single semantic class, for example, in the semantic class HAIRDRESSER the semanteme <<RelatedToMen>> is assigned to the lexical meaning "barber", unlike other lexical meanings which also belong to this class, such as "hairdresser", "hairstylist", etc.

The pragmatic description 540 allows the system to assign a corresponding theme, style or genre to texts and objects of the semantic hierarchy 510. For example, "Economic Policy", "Foreign Policy", "Justice", "Legislation", "Trade", "Finance", etc. Pragmatic properties can also be expressed by semantemes. For example, pragmatic context may be taken into consideration during the semantic analysis.

Figure 6:
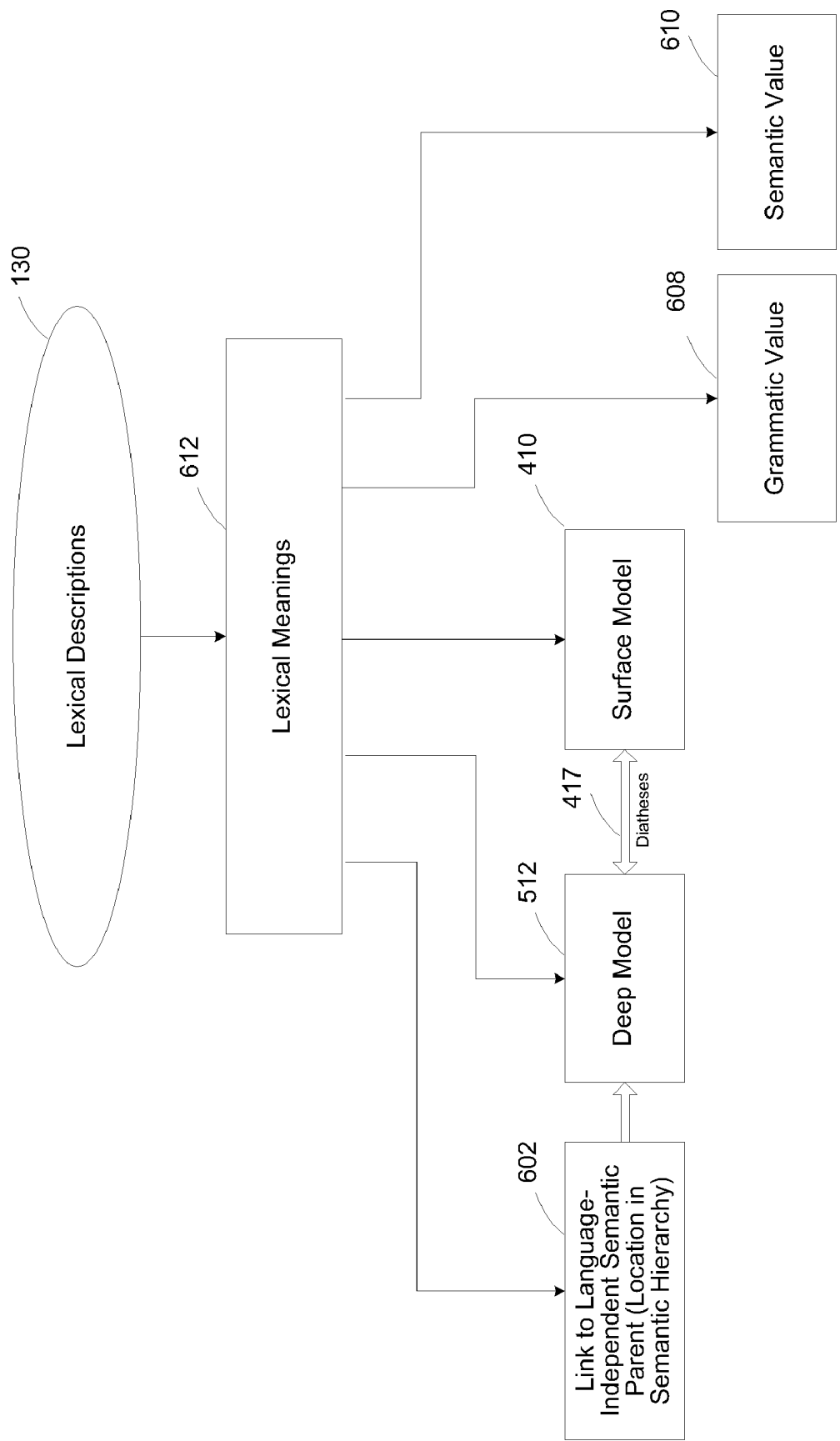
FIG. 6 is a diagram illustrating lexical descriptions according to one exemplary embodiment of the invention.

FIG. 6 illustrates exemplary lexical descriptions. The lexical descriptions 103 represent a plurality of lexical meanings 612 in a specific language for each component of a sentence. For each lexical meaning 612, a link 602 to its language-independent semantic parent may be established to indicate the location of a given lexical meaning in the semantic hierarchy 510.

Each lexical meaning 612 is connected with its deep model 512, which is described in language-independent terms, and surface model 410, which is language-specific. Diatheses can be used as the "interface" between the surface models 410 and the deep models 512 for each lexical meaning 612. One or more diatheses 417 can be assigned to each surface slot 415 in each syntform 412 of the surface models 410.

While the surface model 410 describes the syntactic roles of surface slot fillers, the deep model 512 generally describes their semantic roles. A deep slot description 520 expresses the semantic type of a possible filler, reflects the real-world aspects of the situations, the properties or attributes of the objects denoted by words of any natural language. Each deep slot description 520 is language-independent since different languages use the same deep slot to describe similar semantic relationships or express similar aspects of the situations, and the fillers of the deep slots 514 generally have the same semantic properties even in different languages. Each lexical meaning 612 of a lexical description of a language inherits semantic class from its parent and adjusts its deep model 512.

In addition, the lexical meanings 612 may contain their own characteristics and also inherit other characteristics from language-independent parent semantic class as well. These characteristics of the lexical meanings 612 include grammatical values 608, which can be expressed as grammemes, and semantic value 610, which can be expressed as semantemes.

Every surface model 410 of a lexical meaning includes one or more syntforms 412. Every syntform, 412 of a surface model 410 may include one or more surface slots 415 with their linear order description 416, one or more grammatical values 414 expressed as a set of grammatical characteristics (grammemes), one or more semantic restrictions on surface slot fillers, and one or more of the diatheses 417. Semantic restrictions on a surface slot filler are a set of semantic classes, whose objects can fill this surface slot. The diatheses 417 are the part of relationship 224 between syntactic descriptions 102 and semantic descriptions 104, and represent correspondences between the surface slots 415 and the deep slots 514 of the deep model 512.

Figure 7:
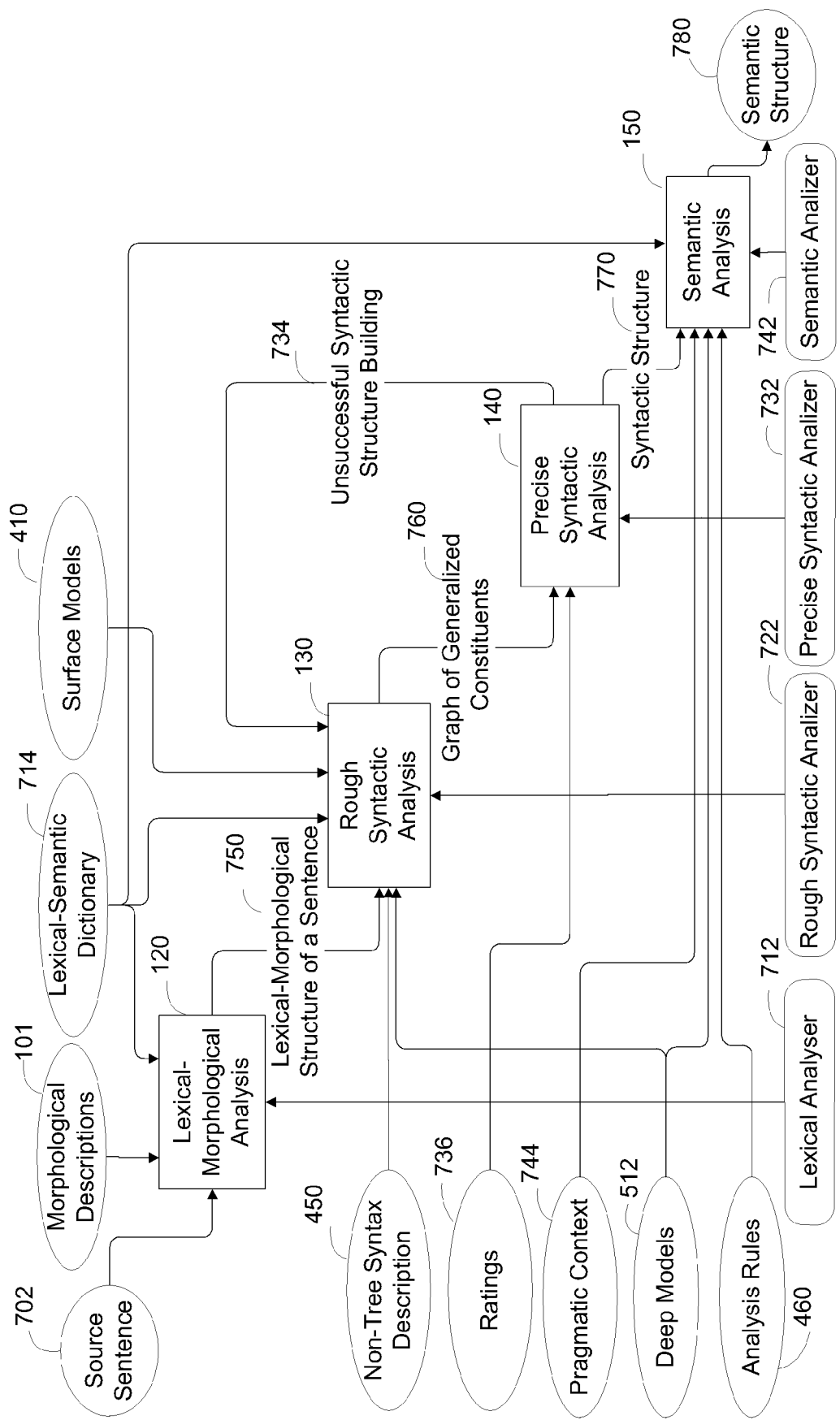
FIG. 7 is a process flow diagram according to one or more embodiments of the invention.

FIG. 7 illustrates another exemplary process flow diagram according to one or more embodiments of the invention. For a source sentence 702, the lexical-morphological analysis 120, the rough syntactic analysis 130, the precise syntactic analysis 140, and the semantic analysis 150 are performed by the methods, software, algorithms, computer systems, computer-readable media, and language analyzers/devices according to embodiments of the invention. For example, each of these analyses and method steps thereof can be adapted to be stored as software, algorithms, and computer-readable media, or alternatively, within computer systems and language analyzing devices; e.g., in a lexical analyzer 712 for performing the lexical and lexical-morphological analyses 120, a rough syntactic analyzer 722 for performing the rough syntactic analysis 130, a precise syntactic analyzer 732 for performing the precise syntactic analysis 140, and a semantic analyzer 742 for performing the semantic analysis 150, etc. As another example, one or more algorithms, computer systems, or analyzer can be used to perform one or more analyses and method steps as described in FIG. 1 and/or FIG. 7.

Lexical Analysis

The lexical analysis 110 is performed on the source sentence 702 as represented in a source/input language, which may be any natural language, for which all the necessary language descriptions have been created. A source sentence 702 may be divided into a number of lexemes, elements, or units, including all the words, word forms, gaps, spacers, and punctuators, etc. present in the source sentence for building a lexical structure of the sentence. A lexeme is a meaningful linguistic unit that is an item in the vocabulary, such as the lexical descriptions 103 of a language.

Figure 8:
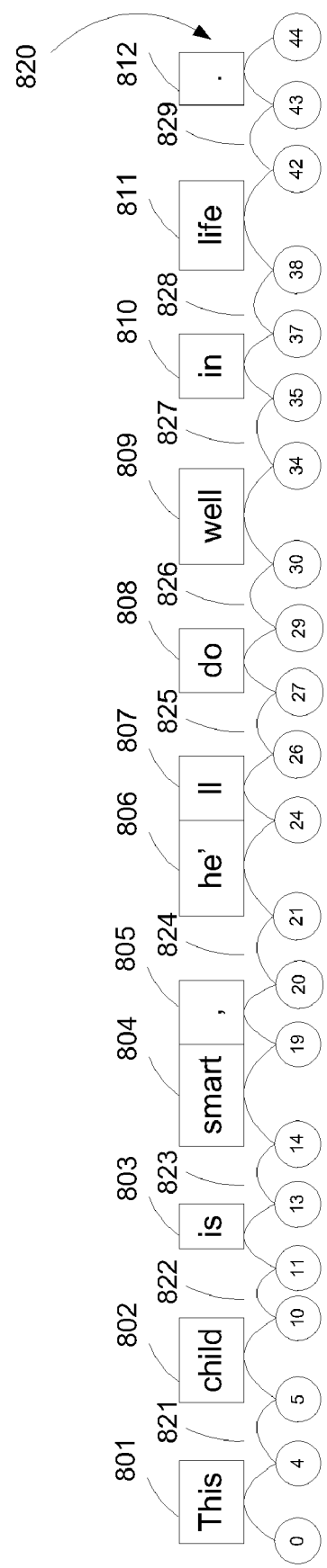
FIG. 8 is an exemplary lexical structure for an exemplary sentence "This child is smart, he'll do well in life". according to one embodiment of the invention.

FIG. 8 shows an exemplary lexical structure for a sentence 820, "This child is smart, he'll do well in life". in English, where all words and punctuators are accounted for, having a total of twelve (12) elements 801-812 or entities, and nine (9) gaps 821-829. The gaps 821-829 can be represented by one or more punctuators, blank spaces, etc.

From the elements or entities 801-812 of the sentence, a graph of its lexical structure is built. Graph nodes are coordinates of symbols of beginning and end of the entities and its arcs are words, gaps between the entities 801-812 (word forms and punctuators), or punctuators. For example, the graph nodes are shown in FIG. 8 as coordinates: 0, 4, 5, . . . , 44. Incoming and outcoming arcs are shown for each coordinate and arcs can be made for the corresponding entities 801-812 as well as the gaps 821-829. The lexical structure for the sentence 820 can be used later during the rough syntactic analysis 130.

Lexical Morphological Analysis

Referring back to FIG. 7, the lexical-morphological analysis 120 is performed on the source sentence 702. During the lexical-morphological analysis 120 each element of the source sentence 702 are searched in order to find one or more word forms, which is not a space or a punctuator, assign one or more pairs of "lexical meaning-grammatical value" corresponding to each word form, and generate a lexical-morphological structure 750 for the source sentence 702. For example, in the sentence 820, elements 801-812 are found and among them, the word "he'll" is divided into two elements, "he'" and "ll", as shown in FIG. 8 as the element 806 and the element 807.

As shown in FIG. 7, the morphological descriptions 101 for the source language (e.g., the word-inflexion description 310 and the word-formation description 330, etc.) and a lexical-semantic dictionary 714 are used to provide a set of lexemes for each word form. Each lexeme may correspond to one or more (usually multiple) word forms, one or more corresponding lexical meanings 612 and grammatical values 608 obtained from the lexical-semantic dictionary 714, an their corresponding grammatical values 608 obtained from the morphological descriptions 101. The grammatical values 608 are represented as a set of values of grammatical attributes (expressed in grammemes) of a word form. Examples of these grammatical attributes include, but are not limited to, the part of speech, number, gender, case, etc. A complete set of pairs of "lexical meaning-grammatical value" is then generated for each word form in the source sentence 702 and used to build the lexical-morphologic structure 750 for the source sentence 702.

Figure 9:
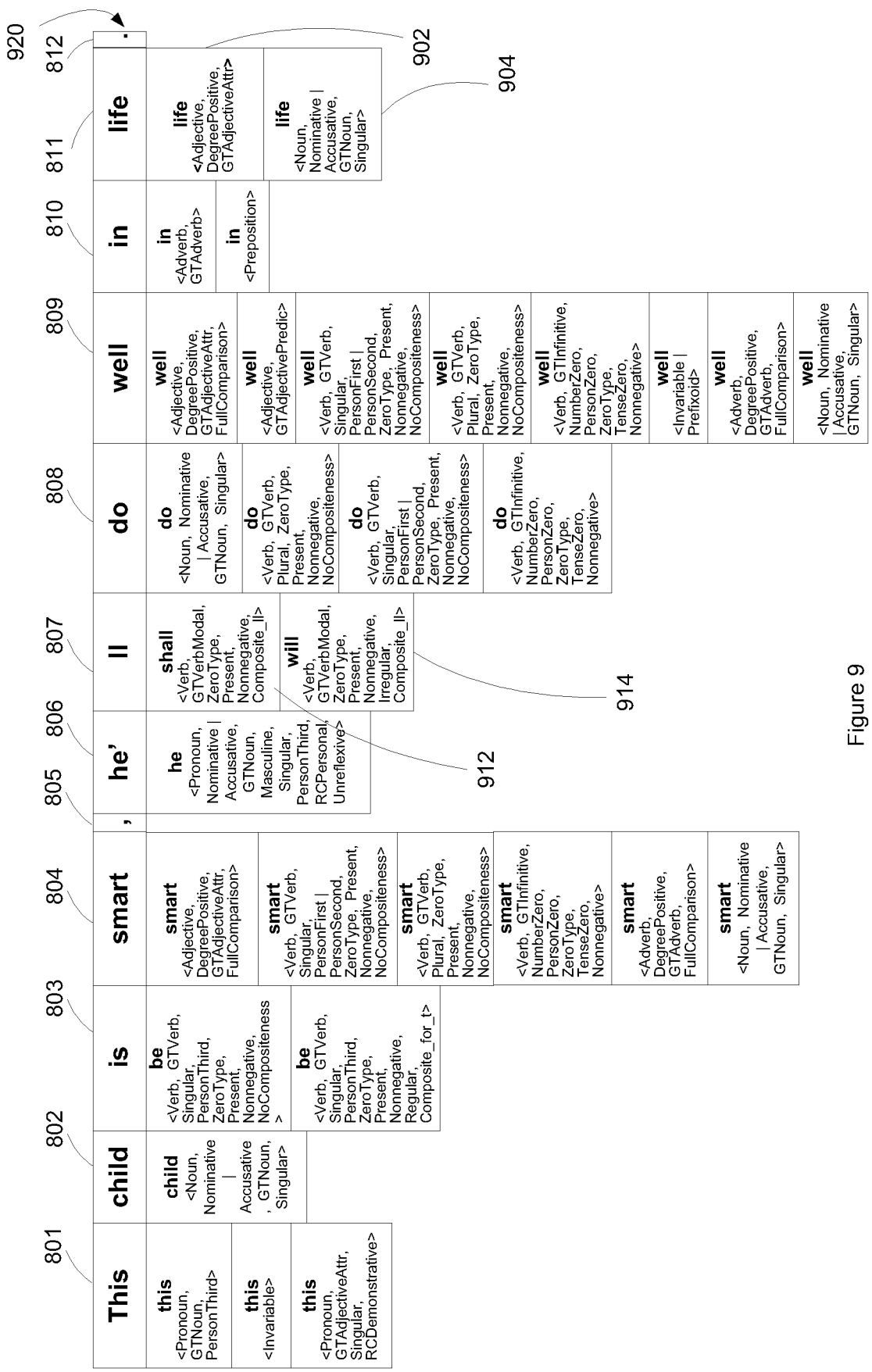
FIG. 9 is a lexical-morphological structure for an exemplary sentence according to one embodiment of the invention.

FIG. 9 illustrates an example of the lexical-morphological structure 750 having a complete set of pairs of "lexical meaning-grammatical value" for the sentence 820. For example, "ll" may mean "shall" 912 and "will" 914 as its lexical meanings 612. For the lexical meaning of "shall" 912, the grammatical values 608 is <Verb, GTVerbModal, ZeroType, Present, Nonnegative, Composite_II>, as shown in FIG. 9. As another example, the grammatical value 608 for the lexical meaning "will" 914 is <Verb, GTVerbModal, ZeroType, Present, Nonnegative, Irregular, Composite_II>.

During the initial stage of the lexical-morphological analysis 120, lemmatization (searching and assigning lexemes) and obtaining pairs of lexical meaning-grammatical value from the lexical-semantic dictionary 714 are concurrently made. The lexeme of the word form, its lemma, and morphological grammatical values for all elements for the source sentence 702 are searched and found by using the lexical-semantic dictionary 714. If there may be various grammatical values 608 for a word form found for a single category, the lexical-morphological structure 750 may include all the possible grammatical values 608 connected by "or".

For example, six pairs of "lexical meaning-grammatical value" are found for the word form "smart", as shown in FIG. 9. As a result, the word form "smart" may have the same lexical meaning of "smart" but six (6) different grammatical values 608. Depending on its presence in different parts of speech, the word form "smart" may be Adjective, Verb, Adverb, Noun, etc, and there may be three different grammatical values for Verb as the value of the "Part of speech" category, as shown in FIG. 9. As another example, the word form "life" may have two lexical meaning-grammatical value pairs generated having the lexical meaning 902 of "life" paired with the grammatical value of <Adjective, DegreePositive, GTAdjectiveAttr> and lexical meaning 904 of "life" paired with <Noun, Nominative|Accusative, GTNoun, Singular>.

In addition, different lexical meanings may correspond to the same lexeme, for example, the lexeme "smart" as an adjective has the following lexical meanings with different semantics (as given, for example, in the Oxford Thesaurus), including 1) "well dressed, well turned out, fashionably dressed, etc". ; 2) "fashionable, stylish, high-class, exclusive, chic, fancy, etc". ; 3) "clever, bright, intelligent, sharp, sharp-witted, quick-witted, etc". , among others. These different lexical meanings have proper language-independent semantic parents, different deep models, and different surface models. During the lexical analysis stage, all these lexical meanings are generalized, but the whole list is stored/saved in order to use their surface and deep models for further analysis.

Since every lexical meaning in any given language goes back to the semantic class which is the parent of the lexical meaning and inherits some characteristics of the parent semantic class, a corresponding lexical description 103 with its surface model 410 and deep model 512 can be found in the lexical-semantic dictionary 714. All the lexical descriptions 103 and the morphological descriptions 101 related to all the lexical meanings 612 of all word forms of the source sentence 702 are used in the lexical-morphological analysis 120. Once a complete set of pairs of "lexical meaning-grammatical value" for the source sentence 702 are made, merging of the grammatical values 608 are performed.

Figure 10:
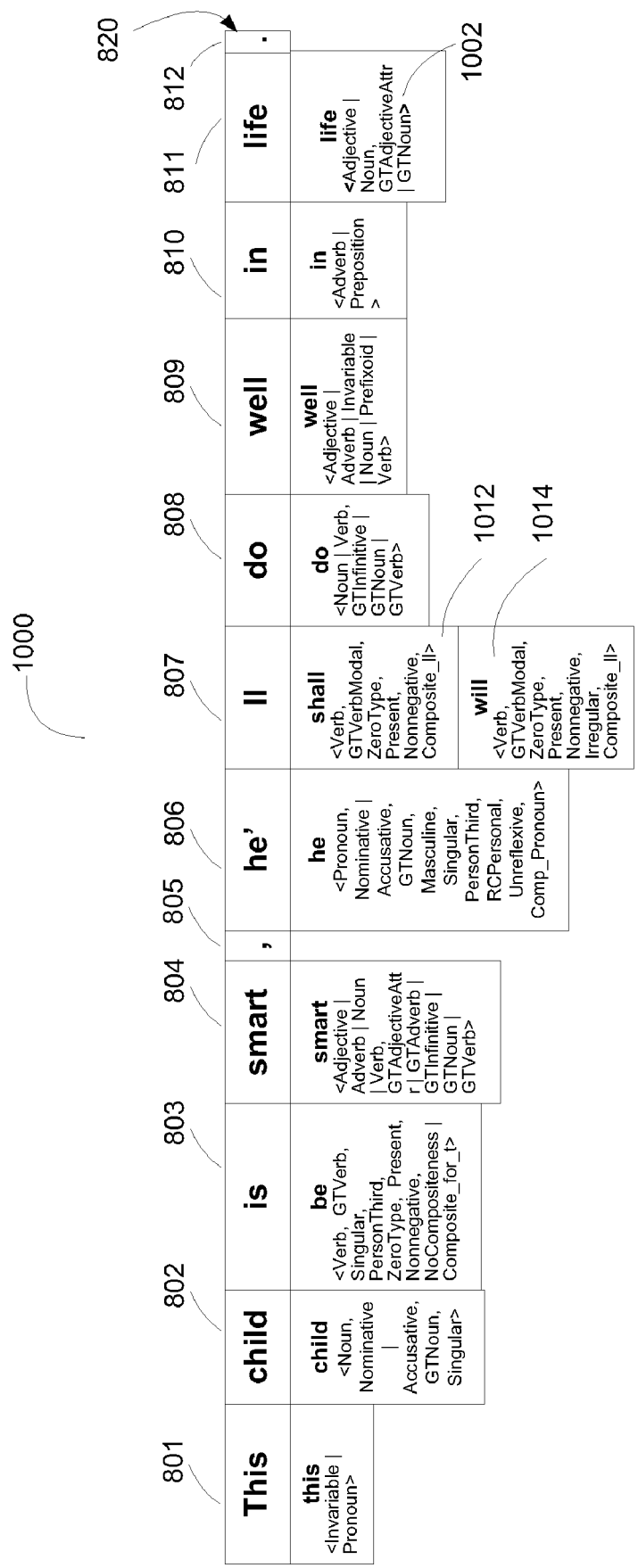
FIG. 10 is the result of generalization of grammatical values for the lexemes identified in the exemplary sentence according to one embodiment of the invention.

FIG. 10 shows the results of merging of the grammatical values 608 for each lexeme of the sentence 820, illustrating an exemplary merged lexical-morphological structure 1000 with merged grammatical values 608 for the entities 801-812 of the sentence 820. As an example, the two pairs of "lexical meaning-grammatical value" for the word form "life" in the sentence 820 are merged into a generalized grammatical value 1002 to mean "life <Adjective|Noun, GTAdjectiveAttr|GTNoun>", which denotes, for the lexeme "life", the grammatical value expressed as "Adjective or Noun" at category PartOfSpeech and as "GTAdjectiveAttributive or GTNoun" at category GrammaticalType. As a result, the generalized grammatical value 1002 for "life" in the sentence 820 is <Adjective|Noun, GTAdjectiveAttri|GTNoun>. As another example, the two pairs of "lexical meaning-grammatical value" for the word form "ll" in the sentence 820 with the lexical meanings of "shall" 912 and "will" 914 can not be merged and for the entity 807 the two pairs of lexical meaning-grammatical value 1012, 1014 remain to mean "shall" and "will" in the merged lexical-morphological structure.

Once the lexical-morphological structure 750 is constructed and generalized grammatical values, if generalization/merging is possible, are provided for each word form, a syntactic analysis is performed. The syntactic analysis may be performed in two steps, the rough syntactic analysis 130 and the precise syntactic analysis 140, which are performed bottom-up and top-down, respectively.

Rough Syntactic Analysis

As shown in FIG. 7, the rough syntactic analyzer 722 or its equivalents thereof is adapted to generate the graph 760 of the generalized constituents from the lexical-morphological structure 750 using the surface models 410, the deep models 512, and the lexical-semantic dictionary 714. All the possible surface syntactic models for each element of lexical-morphological structure of the sentence are applied, and then all the possible constituents are built and generalized. Accordingly, all the possible syntactic descriptions and syntactic structures for the source sentence 702 are considered and, as a result, the graph 760 of the generalized constituents is built from a plurality of the generalized constituents. The graph 760 of generalized constituents reflects, on a surface model level, the relationships between the words of the source sentence 702.

During the rough syntactic analysis 130, every element of the source sentence 702 which is not a space or a punctuator is viewed as a potential core of a constituent. For example, in the sentence 820, the elements 801-811 can be used as a potential core of a constituent and one or more constituents can be generated for the elements 801-811.

The building of the graph 760 of generalized constituents starts with building those constituents which have only the core word form and further expands to build constituents of the next level by including neighboring constituents. For each pair of "lexical meaning-grammatical value" which corresponds to a non-trivial arc of lexical-morphological structure, its surface model 410 is initialized, attempting to attach other constituents in the surface slots 415 of the syntforms 412 of its surface model 410 to the right and the left neighboring constituents. If an appropriate syntform 412 is found in the surface model 410 of the corresponding lexical meaning, the selected lexical meaning may be the core of a new constituent.

The graph 760 of generalized constituents is first built as a tree, from the leaves to the root (bottom up). Building of additional constituents is performed bottom-up by attaching child constituents to parent constituents via filling the surface slots 415 of parent constituents to cover all the initial lexical units of the source sentence 702.

The root of the tree is the main clause, representing a special constituent corresponding to various types of maximal units of a text analysis (complete sentences, enumerations, titles, etc.). The core of the main clause is generally a predicate. During this process, the tree actually becomes a graph, because lower-level constituents (the leaves) can be included into different upper-level constituents (the root).

Some of the constituents which are built for the same element of the lexical-morphological structure may be then generalized to obtain generalized constituents. Constituents are generalized by the lexical meanings 612, by the grammatical values 414, for example, by parts of speech, by their boundaries, among others. Constituents are generalized by the boundaries, since there may be very different syntactic relationships in the sentence, and the same word may be included in different constituents. As a result of the rough syntactic analysis 130, the graph 760 of generalized constituents is built which represents the whole sentence.

Figure 11:
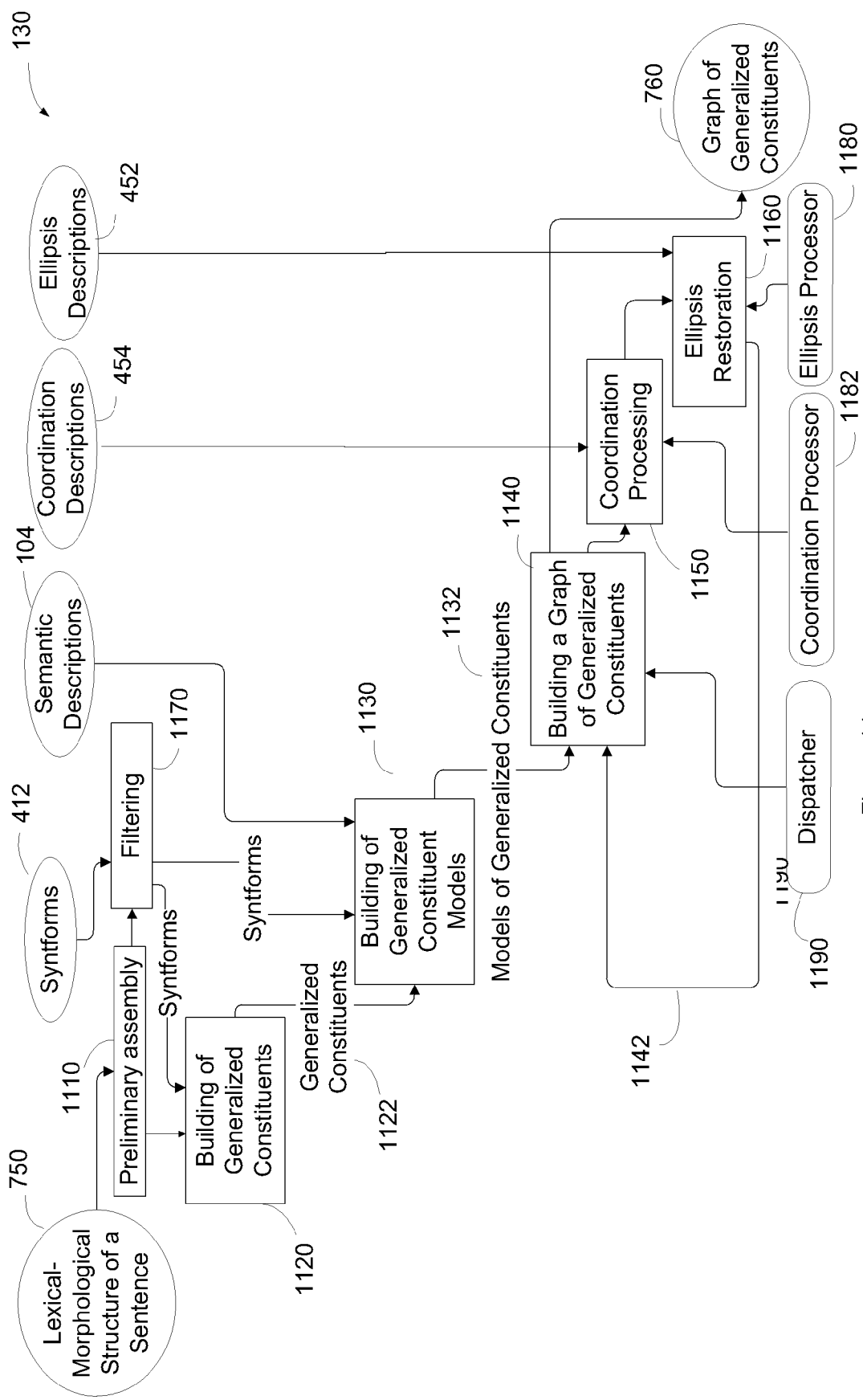
FIG. 11 is a process flow diagram illustrating rough syntactic analyses according to one or more embodiments of the invention.

FIG. 11 illustrates in further detail the rough syntactic analysis 130 according to one or more embodiments of the invention. The rough syntactic analysis 130 generally includes preliminary assembly 1110 of the constituents, building of generalized constituents 1120, filtering 1170, building of generalized constituent models 1130, building 1140 a graph of generalized constituents, coordination processing 1150, and restoring ellipsis 1160, among others.

The preliminary assembly 1110 of the constituents during the rough syntactic analysis 130 is performed on the lexical-morphological structure 750 of the sentence to be analyzed, including certain word groups, the words in brackets, inverted commas, etc. Only one word in the group (the constituent core) can attach or be attached to constituents outside the group. The preliminary assembly 1110 is performed early during the rough syntactic analysis 130 before buildings of generalized constituents 1120 and building of the generalized constituent models 1130 to cover all the boundaries of the whole sentence.

Building of generalized constituents 1120 generally require that all possible pairs of the lexical meaning 612 and the grammatical value 414 are found or assigned for each of the constituents and attach the surface slots of the child constituents thereof to each of the constituents. Lexical units of the source sentence 702 can form into core constituents at bottom levels. Each constituent can be attached to a constituent at a higher level if the surface slots 415 of the constituent at the higher level can be filled. Thus, the constituents are further expanded to include the neighboring constituents built at previous constituent building process until all of the possible constituents have been built to cover the entire sentence.

During rough syntactic analysis 130, the number of the different constituents which may be built and the syntactic relationships among them are considerably large, some of the surface models 410 of the constituents are chosen to be filtered through the process of filtering 1170 prior to and after the building the constituents in order to greatly reduce the number of the different constituents to be considered. Thus, at the early stage of the rough syntactic analysis 130, the most suitable surface models and syntforms are selected on the basis of a prior rating. Such prior rough ratings include ratings of lexical meanings, ratings of fillers, ratings of semantic descriptions, among others.

The filtering 1170 during the rough syntactic analysis 130 include filtering of a set of syntforms 412 performed prior to and during the building of generalized constituents 1120. The syntforms 412 and the surface slots 415 are filtered a priori, and constituents are filtered after they are built. The process of the filtering 1170 distills out a number of syntforms including, but not limited to, those syntforms that do not correspond to the grammatical values of the constituent, those syntforms where none of the core slots can be filled, those syntforms with special slots which describe grammatical movement, among others. A special slot, such as relativization and question, presupposing a special lexeme (relative or interrogative pronoun), is filtered out if the special lexeme is not present in the sentence.

In general, the syntax forms (syntforms 412) which do not have fillers for at least one surface slot can be filtered and discarded. In addition, those lexical meanings 612 which do not have syntforms 412 with filled surface slots 415 are filtered and discarded. The rough syntactic analysis 130 is impossible to succeed if there is no syntform and no filled surface slot, and as such the filtering 1170 is performed.

Once all possible constituents are built, the generalization procedure is performed for building of the generalized constituents 1120. All possible homonyms and all possible meanings for elements of the source sentence which are capable of being present in the same part of a speech are condensed and generalized, and all possible constituents built in this fashion are condensed into generalized constituents 1122.

A generalized constituent 1122 describes all the constituents with all the possible boundaries in a given source sentence which have a word form as the core constituent and various lexical meanings of this word form. Since the constituents are generalized, a single constituent for each lexical meaning corresponding to each entity of a sentence, including homonyms, is built, and their syntactic forms may be analyzed simultaneously.

Next, the building of generalized constituent models 1130 is performed and a set of models 1132 of generalized constituents having generalized models of all generalized lexemes are built. A generalized constituent model of a lexeme contains a generalized deep model and a generalized surface model. A generalized deep model of a lexeme includes the list of all of the deep slots which have the same lexical meaning for a lexeme, together with the descriptions of all the requirements for the fillers of the deep slots. A generalized surface model contains information about the syntforms 412, where the lexeme may occur, about the surface slots 415, about the diathesis 417 corresponding between the surface slots 415 and the deep slots 514, and about the linear order description 416.

The syntforms 412 and the surface slots 415 that are significant for this lexeme are selected with the help of the bit-mask. In addition, the models 1132 of the generalized constituents are used because a constituent is generalized not only by lexical meanings and syntactic forms of its core, but also by the fragments it fills. The use of the models 1132 of the generalized constituents reduces the number of wrong relationships and helps to optimize the process to build a syntactic tree so that all possible boundaries are considered.

The diathesis 417 is built during the rough syntactic analysis 130 as the correspondence between generalized surface models and generalized deep models. The list of all possible semantic classes for all the diatheses 417 of the lexeme is calculated for each surface slot 415.

As shown in FIG. 11, information from the syntforms 412 of the syntactic descriptions 102 as well as the semantic descriptions 104 are used to build the models 1132 of the generalized constituents. For example, dependent constituents are attached to each lexical meaning 612 and the rough syntactic analysis 130 may also need to determine whether a "candidate" constituent or a dependent constituent can be the filler of the corresponding deep slot of the semantic description 104 for a core constituent. Such compatibility analysis allows the wrong syntactic relationships to be discarded early.

Then, the building 1140 of the graph of the generalized constituents is performed. The graph 760 of generalized constituents which describes all possible syntactic structures of the entire sentence is built by linking and assembling the generalized constituents 1122 to each other. The building 1140 of the graph of the generalized constituents is organized via generating and processing of the queue of requests to attach one constituent to another constituent. In general, contact pairs of constituents representing contact groups of words in the sentence can be included in the request queue.

A constituent can be attached to different surface slots of another constituent and a child constituent can be attached to different parent constituents. In each case, a request for attachment of one constituent to another constituent can be generated. The requests can be processed by a subsystem, such as a dispatcher 1190. If attachment to the selected surface slot is performed or found impossible, the request is removed from the queue of active request 1310 of the dispatcher 1190.

Figure 13:
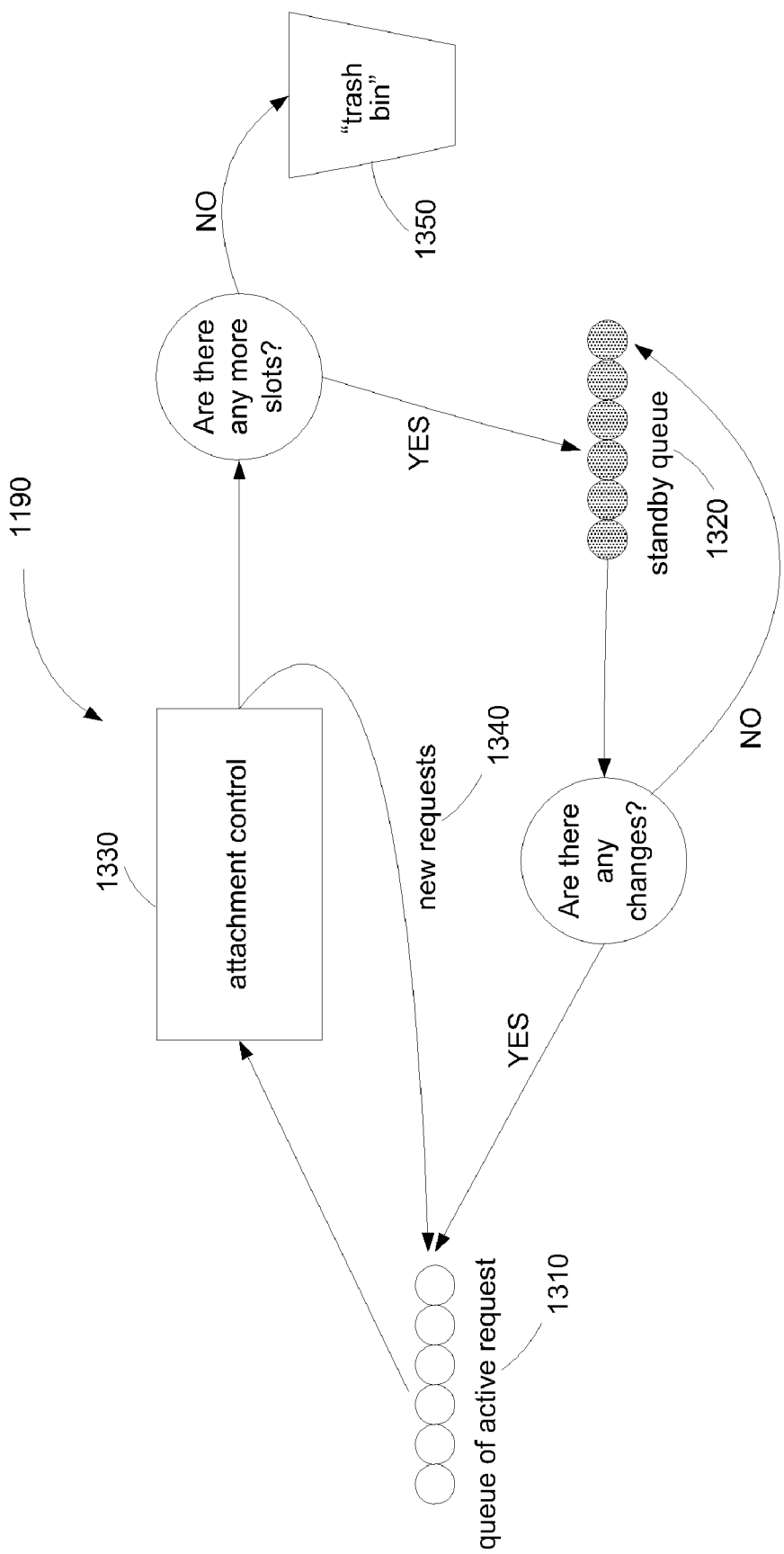
FIG. 13 is an exemplary dispatching rule according to one embodiment of the invention.

One or more dispatching algorithms adapted to execute the processing of different requests can be included in the dispatcher 1190. FIG. 13 is an exemplary dispatching rule according to one embodiment of the invention that can be written into dispatching algorithms for the dispatcher 1190. Queues, including active requests queue 1310 and standby queue 1320, among others, can be processed by the dispatcher 1190. The active request queues 1310 as well as passive request queues in the standby queue 1320 are represented as circles.

Initially, all contacting constituent pairs are put into the active requests queue 1310. When a new constituent pair appears in the set, the dispatcher 1190 receives a signal that a new constituent pair has appeared to be put unto the dispatcher queue. The dispatcher 1190 is adapted to process requests from the active requests queue 1310 through an attachment control 1330. If no active (unfilled) slots are in a request, the request is deleted and put into a trash bin 1350. Otherwise, the unfinished request is put in the standby queue 1320. When all requests in the active requests queue 1310 have been processed, the dispatcher 1190 may try to refill the queue with requests from the standby queue 1320. The dispatcher 1190 makes sure that at least one of the constituents involved in the request is changed and attached. The dispatcher 1190 stops its work when the active requests queue is empty and cannot be refilled.

The dispatcher 1190 or any devices, systems, computer-readable media, adapted to perform the building 1140 of the graph of the generalized constituents can wait and search for new constituent pairs in order to put these constituent pairs into the dispatcher queue, such as by keeping the right and left directions of the neighboring constituents of a constituent. For example, during attaching a child constituent to the parent constituents, the left constituent pair of the child constituent is added to the left of the parent constituent and the right constituent pair of the child constituent is added to the right of the parent constituent.

As shown in FIG. 11, the coordination processing 1150 is also performed on the graph 760 of the generalized constituents. Coordination is a language phenomenon which is presented in sentences with enumeration and/or a coordinating conjunction, such as "and", "or", "but", etc. A simple example of a sentence with coordination—"John, Mary and Bill came home". In this case only one of coordinated child constituent is attached in the surface slot of a parent constituent during building 1140 the graph of the generalized constituents. If a constituent, which may be a parent constituent, has a surface slot filled for a coordinated constituent, then all coordinated constituents are taken and an attempt is made to attach all these child constituents to the parent constituent, even if there is no contact or attachment between the coordinated constituents. During coordination processing 1150, the linear order and multiple filling possibility of the surface slot are determined. If the attachment is possible, a proform which refers to the common child constituent is created and attached. As shown in FIG. 11, the coordination processor 1182 or other algorithms, devices, and computer subsystems can be adapted to perform the coordination processing 1150 using coordination descriptions 452 in the building 1140 of the graph of generalized constituents.

The building 1140 of the graph of the generalized constituents can be impossible without ellipsis restoration 1160. Ellipsis is a language phenomenon which is represented by the absence of core constituents. Ellipsis can also be related with coordination. The process of the ellipsis restoration 1160 is also needed to restore a missing constituent. An example of an elliptical English sentence is "The president signed the agreement and the secretary [signed] the protocol". As discussed above, the ellipsis restoration 1160 can be used to generate the new request 1340 and new constituent pairs.

As shown in FIG. 11, the ellipsis processor 1180 or other algorithms, devices, and computer subsystems can be adapted to perform the ellipsis restoration 1160. In addition, the ellipsis descriptions 452 which contain proform models can be adapted to aid the ellipsis processor 1180 and process core ellipsis to build the graph 760 of generalized constituents. Proforms may be auxiliary elements inserted into a sentence when establishing non-tree links. A proform model may include templates (patterns) of syntforms. These proform templates determine the required surface slots and their linear order. All constituents in the sentence for each proform are searched and the possibility to attach the constituent to the first of the required slots of the syntform-template is determined.

The coordination processing 1150 and the ellipsis restoration 1160 are performed during each program cycle of the dispatcher 1190 after the building 1140 of the graph of the generalized constituents and then the building 1140 may continue, as indicated by an arrow of returning back 1142. If the ellipsis restoration 1160 is needed and called upon during the rough syntactic analysis 130 due to, for example, the presence of constituents left alone without any parent constituents being attached to, only these constituents are processed.

The dispatcher 1190 stops when the active request queue 1310 is empty and cannot be refilled. The dispatcher 1190 can be a device, system, or algorithm, which keeps all the information about the constituents that have been modified. A constituent is considered modified if changes have been introduced to any of its properties which describe the sub-tree, including boundaries and the set of pre-child constituents. In addition, during the building 1140 of the generalized constituents 1122, clause substitution is performed. Clauses for direct speech and proper names are substituted.

Figure 12:
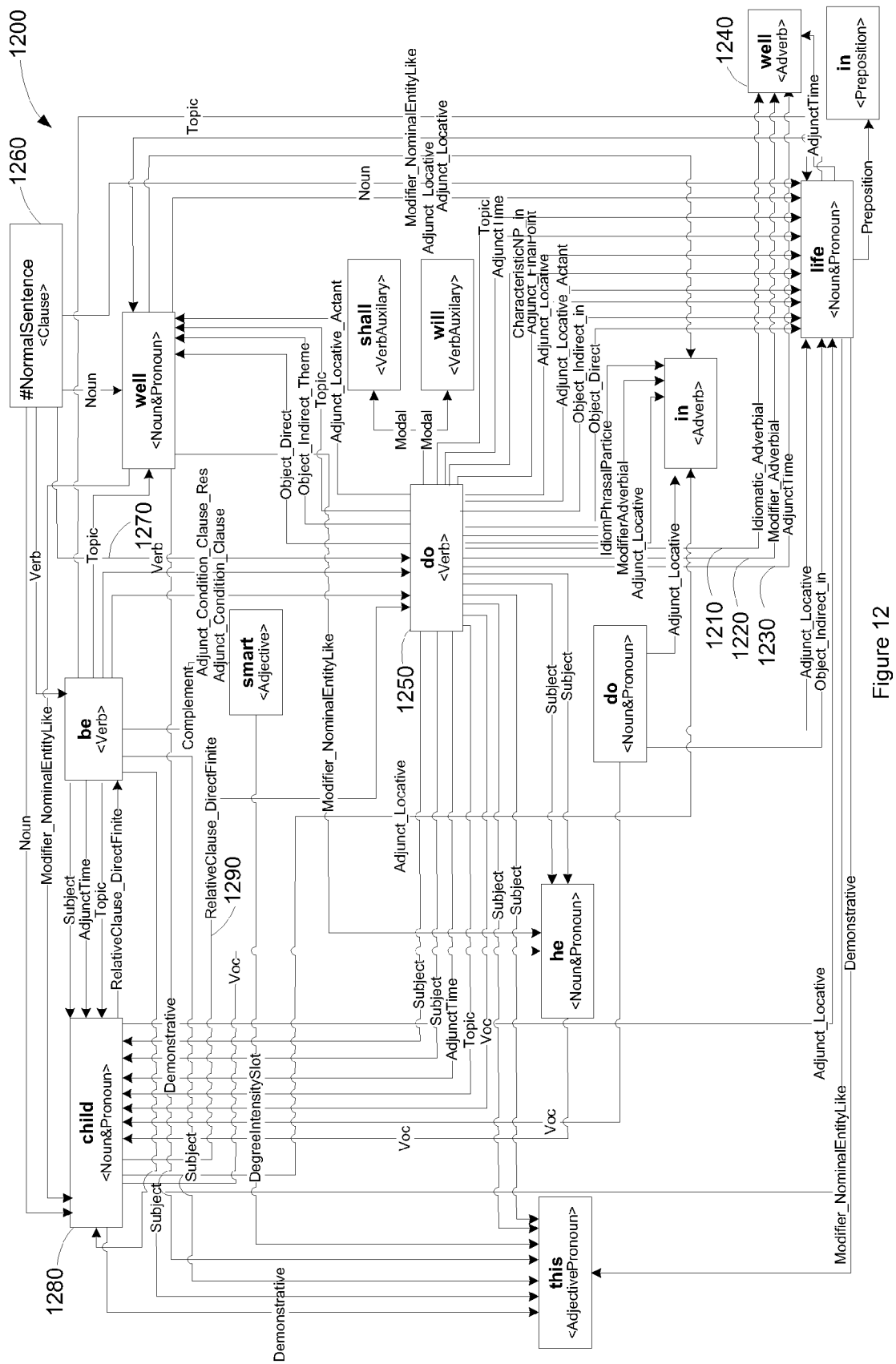
FIG. 12 is an exemplary graph of generalized constituents for the sentence "This child is smart, he'll do well in life". according to one embodiment of the invention.

FIG. 12 is an exemplary graph 1200 of generalized constituents illustrating the graph of the generalized constituents for the sentence 820 "This child is smart, he'll do well in life". The constituents are represented by rectangles, each constituent having a lexeme as its core. Morphological paradigm (as a rule, the part of speech) of a constituent core is expressed by grammemes of the part of speech and displayed in broken brackets below the lexeme. A morphological paradigm as a part of word-inflection description 310 of morphological description 101 contains all information about word-inflection of one or more part of speech. For example, since "do" can have two parts of speech: <Verb> and <Noun> (which is represented by the generalized morphological paradigm <Noun&Pronoun>), two constituents for "do" are shown in the graph 1200.

Links in the graph 1200 represent filled surface slots of the constituent core. Slot names are displayed on the arrows of the graph. The constituent is formed by the lexeme-core which may have outgoing named arrows which denotes surface slots 415 filled by child constituents together with child constituents themselves. An incoming arrow means attaching this constituent to a surface slot of another constituent. The graph 1200 is so complicated and has so many arrows, because it shows all relationships which can be established between constituents of the sentence 820. Among them there are many relationships which, however, will be discarded. A value of said prior rough rating is saved by each arrow denoting a filled surface slot. Only surface slot and relationships with high rating scores will be selected first of all at the next stage of syntactic analysis.

Often several arrows may connect the same pairs of constituents. It means that there are different acceptable surface models for this pair of constituents, and several surface slots of the parent constituent may be independently filled by this child constituent. So, three surface slots named Idiomatic_Adverbial 1210, Modifier_Adverbial 1220 and Adjunct-Time 1230 of the parent constituent "do<Verb>" 1250 may be independently filled by the child constituent "well<Adverb>" 1240 in accordance with surface model of the constituent "do<Verb>". Thus, roughly speaking "do<Verb>" 1250+ "well<Adverb>" form a new constituent with the core "do<Verb>" which is attached to another parent constituent, for example, to #NormalSentence<Clause> 1260 in the surface slot Verb 1270, and to "child<Noun&Pronoun>" 1290 in the surface slot RelativClause_DirectFinite 1290 The marked element #NormalSentence<Clause>, being the "root", corresponds to the whole sentence.

Precise Syntactic Analysis

The precise syntactic analysis 140 is performed to build a syntactic tree, which is a tree of the best syntactic structure 770, for the source sentence. Many syntactic structures can be built and the most probable syntactic structure is obtained as the best syntactic structure 770. As shown in FIG. 7, the precise syntactic analyzer 732 or its equivalents thereof is adapted to perform the precise syntactic analysis 140 and generate the best syntactic structure 770 on the basis of calculating ratings using a priori ratings 736 from the graph 760 of the generalized constituents. The priori ratings 736 include ratings of the lexical meanings, such as frequency (or probability), ratings of each of the syntactic constructions (e.g., idioms, collocations, etc.) for each element of the sentence, and the degree of correspondence of the selected syntactic constructions to the semantic descriptions of the deep slots 514. Rating scores are then calculated and obtained/stored.

Hypotheses about the overall syntactic structure of the sentence are then generated. Each hypothesis is represented by a tree which is a subgraph of the graph 760 of the generalized constituents to cover the entire sentence, and rating is calculated for each syntactic tree. During the precise syntactic analysis 140, hypotheses about the syntactic structure of the source sentence are verified by calculating several types of ratings. These ratings are calculated as the degree of correspondence of the fillers of the surface slots 415 of the constituent to their grammatical and semantic descriptions, such as grammatical restrictions (e.g., the grammatical values 414) in the syntforms 412 and semantic restrictions on the fillers of the deep slots 514 in the deep models 512. Another types of ratings are the degree of correspondence of the lexical meanings 612 to the pragmatic descriptions 540, which may be absolute and/or relative probability ratings of the syntactic constructions as denoted by the surface models 410, and the degree of compatibility of their lexical meanings, among others.

The calculated rating scores for each hypothesis may be obtained on the basis of a priori rough ratings found during the rough syntactic analysis 130. For example, a rough assessment is made for each generalized constituent in the graph 760 of the generalized constituents and ratings scores can be calculated. Various syntactic trees can be built with different ratings. Rating scores are obtained, and these calculated rating scores are used to generate hypotheses about the overall syntactic structure of the sentence. To achieve this, the hypotheses with the highest rating are selected. These hypotheses are generated by advancing hypotheses about the structure of the child constituents which are most probable in order to obtain the most probable hypothesis about the overall syntactic structure of the sentence. Ratings are performed during precise syntactic analysis until a satisfactory result is obtained and a best syntactic tree having highest rating can be built.

Then, those hypotheses with the most probable syntactic structure of a whole sentence can also be generated and obtained. From syntactic structure 770 variants with higher ratings to syntactic structure 770 variants with lower ratings, syntactic structure hypotheses are generated during precise syntactic analysis until a satisfactory result is obtained and a best syntactic tree which has the highest possible rating can be built.

The best syntactic tree is selected as the syntactic structure hypothesis with the highest rating value available from the graph 760 of the generalized constituents. This syntactic tree is considered the best (the most probable) hypothesis about the syntactic structure of the source sentence 702. Then, non-tree links in the tree are assigned, and accordingly, the syntactic tree transforms into a graph as the best syntactic structure 770, representing the best hypothesis about the syntactic structure of the source sentence 702. If non-tree relationships can not be assigned in the selected best syntactic tree, the syntactic tree with the second-best rating is selected as the best syntactic tree for further analysis.

When the precise syntactic analysis 140 is unsuccessful or the most probable hypotheses can not be found after initial precise syntactic analysis, returning back 734 for unsuccessful syntactic structure building from the precise syntactic analysis 140 back to the rough syntactic analysis 130 is provided and all syntforms, not just the best syntforms, are considered during the syntactic analysis. If no best syntactic trees are found or the system has failed to define non-tree relationships in all the selected "best" trees, then additional rough syntactic analysis 130 is performed taking into consideration "bad" syntform which were not analyzed before for the method of the invention.

Figure 14:
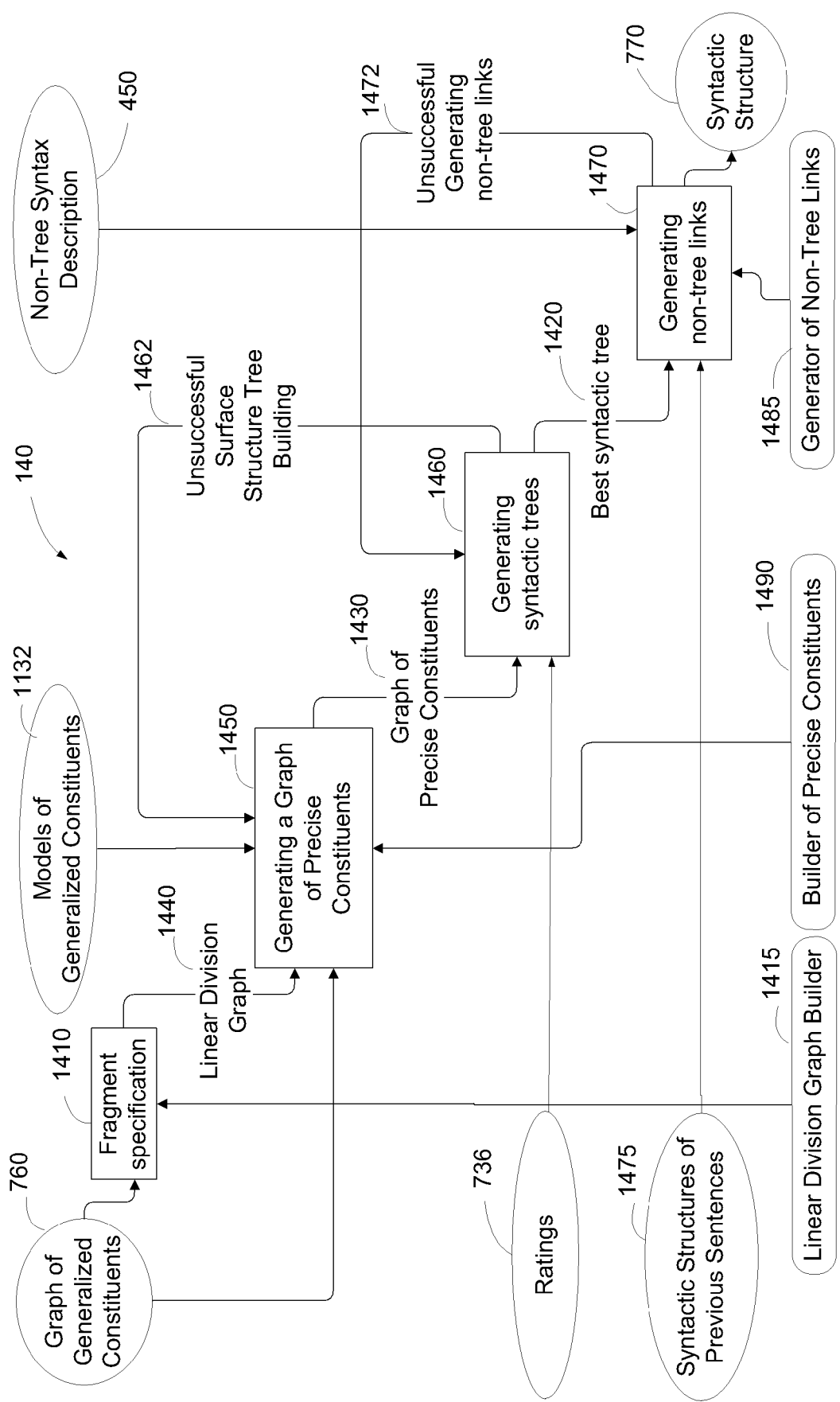
FIG. 14 is a process flow diagram illustrating precise syntactic analyses according to one or more embodiments of the invention.

FIG. 14 illustrates in further detail the precise syntactic analysis 140 performed to select the best syntactic structure 770 according one or more embodiments of the invention. The precise syntactic analysis 140 is performed top-down from the higher levels to the bottom lower levels, from the node of the potential top of the graph 760 of the generalized constituents down to its bottom-level child constituents.

The precise syntactic analysis 140 may contain various stages, including a preliminary stage, a stage 1450 for generating a graph of precise constituents, a stage 1460 for generating syntactic trees and differential selection of the best syntactic tree, a stage 1470 for generating non-tree links and obtaining a best syntactic structure, among others. The graph 760 of generalized constituents is analyzed during the preliminary stage which prepares the data for the precise syntactic analysis 140.

The preliminary stage of the precise syntactic analysis 140 may include fragment specification 1410 and generating 1450 of a graph of precise constituents to obtain a graph of linear division 1440 and a graph of precise constituents 1430, respectively. A linear divisional graph builder 1415 and builder 1490 of precise constituents may be adapted to process the fragment specification 1410 for obtaining the graph of linear division 1440 and the graph of precise constituents 1430. In addition, the models 1132 of the generalized constituents can be used during the building 1450 of the graph of precise constituents.

During the precise syntactic analysis 140, the precise constituents are built recursively. Proper constituents are generated backwardly and recursively. The precise constituents are built from the generalized constituents 1122 to initially perform the fragment specification 1410 thereon. The building 1450 of the graph of precise constituents may include reviewing the graph 1440 of linear division, recursively building the graph 1430 of the precise constituents which may contains fixed but not yet filled child slots, recursive performing the fragment specification 1410 for each graph arc lying on the way, and recursive filling a child slot to attach a child precise constituent built previously, among others. The generalized constituents 1122 are used to build the graph 1430 of precise constituents for generating one or more trees of precise constituents. For each generalized constituent, its possible boundaries and their child constituents are marked.

The stage 1460 for generating the syntactic trees is performed to generate the best syntactic tree 1420. The stage 1470 for generating non-tree links may use the rules of establishing non-tree links and the information from syntactic structures 1475 of previous sentences to analyze one or more best syntactic trees 1420 and select the best syntactic structure 770 among the various syntactic structures. A generator 1485 for generating non-tree links is adapted to perform the stage 1470.

As shown in FIG. 14, the fragment specification 1410 of the precise syntactic analysis 140 is performed initially to consider various fragments which are continuous segments of a parent constituent. Each generalized child constituent can be included into one or more parent constituent in one or more fragments. Then, the graph of linear division 1440 (GLD) can be built as the result of the fragment specification 1410 to reflect the relationships of the parent constituent fragments with the core and child constituents. Additionally, the surface slot for the corresponding child constituents is assigned. The graph of linear division 1440 is the framework for building the graph 1430 of precise constituents. Precise constituents are nodes of the graph 1430 and one or more trees of precise constituents are generated on the basis of the graph 1430 of precise constituents.

The graph 1430 of precise constituents is an intermediate representation between the graph 760 of generalized constituents and syntactic trees. Unlike a syntactic tree, the graph 1430 of precise constituents can still have several alternative fillers for a surface slot. The precise constituents are formed into a graph such that a certain constituent can be included into several alternative parent constituents in order to optimize further analysis for selecting syntactic trees. Such an intermediate graph structure is rather compact for calculating structural ratings.

During the recursive stage 1450 for generating the graph of the precise constituents, the precise constituents are built traversally on the graph 1440 of linear division via the left and right boundaries of the core constituents. For each built path on the graph 1440 of linear division, the set of syntforms is determined; linear order is checked (verified) and rated for each of the syntforms. Accordingly, a precise constituent is created for each of the syntforms, and the building of precise child constituents is recursively initiated.

When a precise child constituent is built, an attempt is made to attach the precise child constituent to the precise parent constituent. When attaching child constituents, restrictions which the child constituents impose on the set of meanings of a parent constituent are taken into account, and the upper lexical rating of the link is calculated. When trying to attach each child constituent, two types of restrictions, which are represented by means of bit masks, are formed: the restriction (mask) on grammatical values of the parent constituent, which is received with the help of the agreement rule, and the restriction (mask) on grammatical values of the child constituent, which is received with the help of the agreement or government rule. Then, for each description of a deep slot which may have diathesis correspondence to the current surface slot, the following restrictions are obtained: the restriction on the lexical meanings of the parent constituent, the restriction on the possible lexical meanings of the child constituent and the restriction on the preferred lexical meanings of the child constituent (the set of preferred semantic classes in the description of the deep slot). Additionally, deep rating is obtained as a degree of conformity of the deep slot with these restrictions.

If there is a suitable identifying word combination in the sentence, for example, an idiom, which meets the restriction on parent lexical meanings, then the rating of the word combination is added to the deep rating. If none of the lexical meanings of child constituent meets the deep restrictions of this deep slot, attachment to this deep slot is impossible. The possibility of attachment to the other deep slots is checked. A deep slot which has the maximal value of the deep rating is selected.

The masks of grammemes for all child constituents which could be attached are merged. The mask on grammatical values of the parent constituent is used for calculating its grammatical value. For example, when child constituents are attached, the grammatical value of the syntactic form according to its correspondence with the child constituents is defined more precisely.

Coordination is also processed when a child constituent attached during the stage 1450. For slots filled by coordination, there exists a need to check that not only the apex of coordination can be attached but its other components as well.

Additionally, ellipsis is also processed when a child constituent attached during the stage 1450. Surface slots which are required in the syntform and do not permit ellipsis may be empty. In this case, when generating a precise constituent, a proform is placed in the empty slot.

As result of the stage 1450, the graph of the precise constituents 1430, which covers the whole sentence, is built. If the stage 1450 for generating the graph of the precise constituents has failed to produce the graph of the precise constituents 1430 which would cover the entire sentence, a procedure which attempts to cover the sentence with syntactically-separate fragments is initiated. In this case, a dummy (fictitious) generalized constituent is generated, where all generalized constituents of the sentence may be attached.

As shown in FIG. 14, when the graph of precise constituents 1430, which covers the sentence, was built, one or more syntactic trees can be generated at the step of generating 1460 during the precise syntactic analysis 140. Generating 1460 of the syntactic trees allows generating one or more trees with a certain syntactic structure. Since surface structure is fixed in a given constituent, adjustments of structural rating scores, including punishing syntforms which are difficult or do not correspond to the style, or rating the communicative linear order, etc., may be made.

The graph of precise constituents 1430 represents several alternatives according to different fragmentation of the sentence and/or different sets of surface slots. So, the graph of precise constituents represents a set of possible trees—syntactic trees, because each slot can have several alternative fillers. The fillers with the best rating may form a precise constituent (a tree) with the best rating. Thus the precise constituent represents unambiguous syntactic tree with the best rating. At the stage 1460, these alternatives are searched and one or more trees with a fixed syntactic structure are built. Non-tree links in the built trees are not defined yet. The result of this step is a set of best syntactic trees 1420 which have the best rating values.

The syntactic trees are built on the basis of the graph of precise constituents. For these precise constituents, syntactic forms, the boundaries of the child constituents and the surface slots are determined. The different syntactic trees are built in the order of descending of their structural rating. Lexical ratings cannot be fully used because their deep semantic structure is not defined yet. Unlike the initial precise constituents, every resulting syntactic tree has a fixed syntactic structure, and every precise constituent in it has only one filler for each surface slot.

During the stage 1460, the best syntactic tree 1420 may generally be built recursively and traversally from the graph 1430 of precise constituents. The best syntactic subtrees are built for the best child precise constituents, syntactic structure is built on the basis of the given precise constituent, and child subtrees are attached to the generated syntactic structure. The best syntactic tree 1420 can be built, for example, by selecting a surface slot with the best quality among the surface slots of a given constituent and generating a copy of a child constituent whose sub-tree is the best quality sub-tree. This procedure is applied recursively to the child precise constituent.

On the basis of each precise constituent, the best syntactic tree with a certain rating score can be generated. This rating score can be calculated beforehand and specified in the precise constituent. After the best syntactic tree is generated, a new precise constituent is generated on the basis of the previous precise constituent. This new precise constituent in its turn generates a syntactic tree with the second-best value of the rating score. Accordingly, on the basis of the precise constituent, the best syntactic tree may be obtained, and a new precise constituent may be built.

For example, two kinds of ratings can be kept for each precise constituent during the stage 1460, the quality of the best syntactic tree which can be built on the basis of this precise constituent, and the quality of the second-best syntactic tree. Also, the rating of the precise constituent includes the rating of the best syntactic tree which can be built on the basis of this precise constituent.

The rating of a syntactic tree is calculated on the basis of the following values: structural rating of the constituent; upper rating for the set of lexical meanings; upper deep rating for child slots; ratings of child constituents. When a precise constituent is analyzed to calculate the rating of the syntactic tree which can be generated on the basis of the precise constituent, child constituents with the best rating are analyzed in every surface slot.

During the stage 1460, rating calculation for the second-best syntactic tree differs only in the fact that for one of the child slots, its second-best child constituent is selected. Any syntactic tree with a minimal rating loss relative to the best syntactic tree must be selected during this stage 1460.

When the stage 1460, additional restrictions on constituents are taken into account. Each precise constituent which gets into the best tree is checked for additional restrictions. If a constituent or one of its child constituents does not meet the restrictions, the constituent receives a mark that its best tree does not meet the additional restrictions. A check is performed to determine whether this subtree meets the additional restrictions.

The rules of additional restrictions are checked during the stage 1460 to make sure whether a constituent meets the restrictions but also suggest the steps which should be taken in certain slots so that the constituent will meet the restrictions. This approach can also significantly increase task-orientation of the search. The restrictions used during the stage 1460 can be defined for any surface slot and the corresponding deep slot. On the basis of the specified restrictions, the difference in quality between the best and second-best tree for this surface slot is calculated. As a result, a generation method is provided whereby a tree which meets the additional restrictions can be found as soon as possible.

Near the end of the stage 1460, a syntactic tree with a fully-defined syntactic structure is built, i.e. the syntactic form, child constituents and surface slots that they fill are defined. Since this tree is generated on the basis of the best hypothesis about the syntactic structure of the initial sentence, this tree is called the best syntactic tree 1420. The returning back 1462 from generating 1460 the syntactic trees to the building 1450 of the graph of precise constituents is provided when there are no syntactic trees with satisfactory rating generated, or the precise syntactic analysis is unsuccessful.

Figure 15:
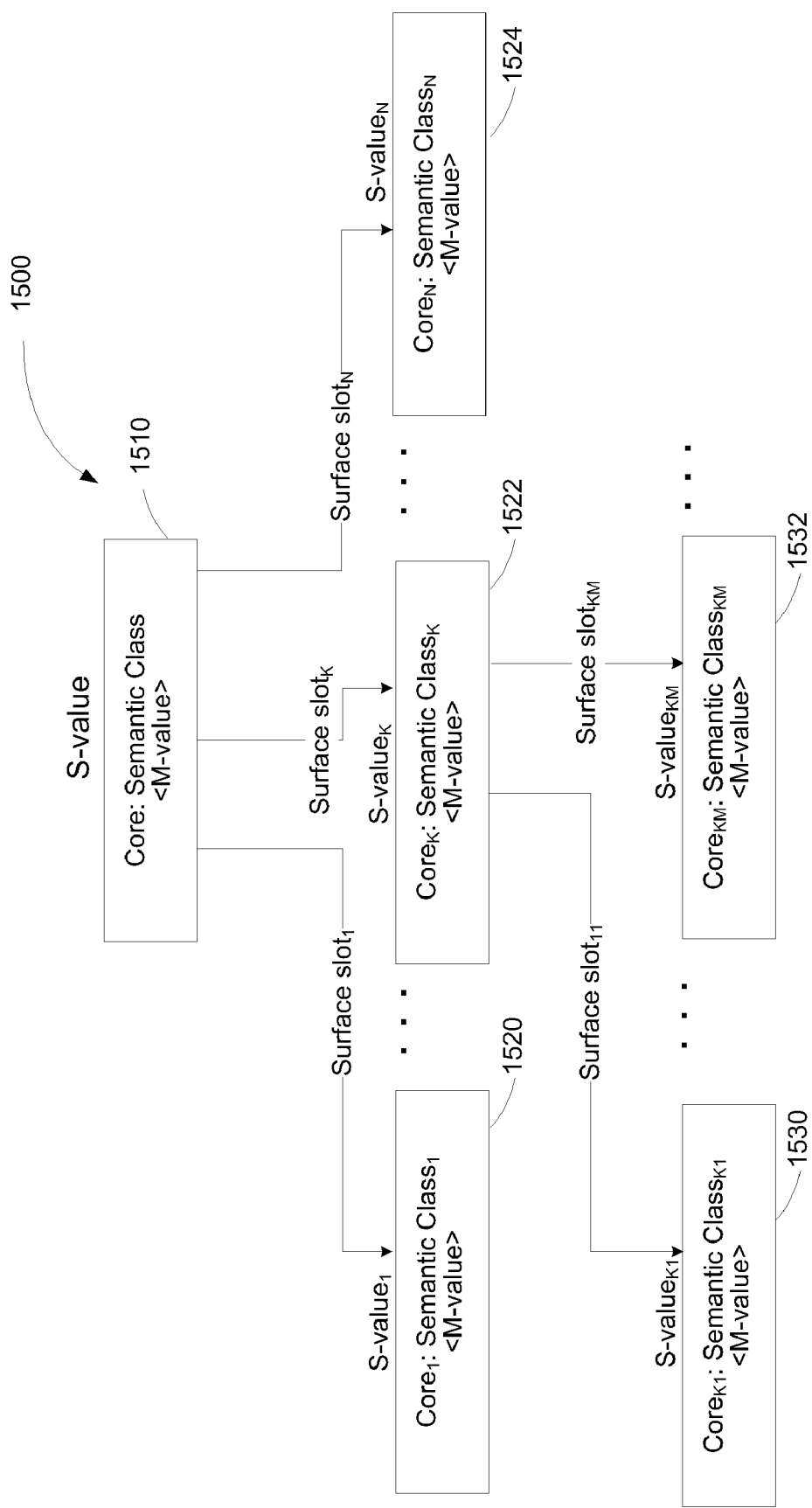
FIG. 15 is an exemplary schematic representation of a syntactic tree according to one embodiment of the invention.

FIG. 15 illustrates schematically an exemplary syntactic tree according to one embodiment of the invention. In FIG. 15, constituents are shown as rectangles, arrows show filled surface slots. A constituent has a word at its core (Core) with its morphological value (M-value) and semantic parent (Semantic class) and can have smaller constituents of the lower level attached. This attachment is shown by means of arrows named Slot. Each constituent has also a syntactic value (S-value), expressed as the grammemes of the syntactic categories thereof. These grammemes are the properties of the syntactic forms selected for the constituent during the precise syntactic analysis 140.

Figure 16:
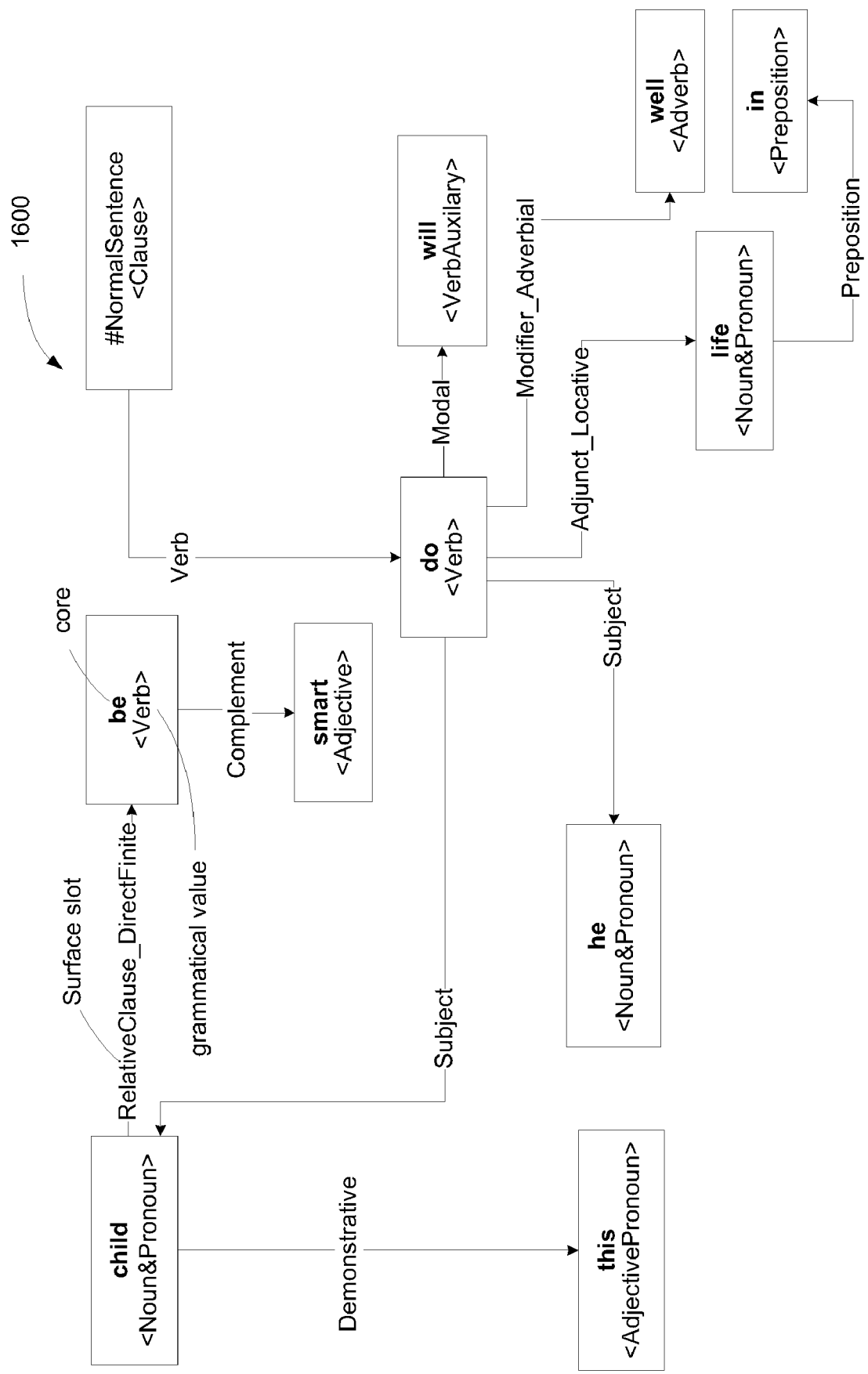
FIG. 16 is an exemplary syntactic tree of the above mentioned sentence "This child is smart, he'll do well in life".

FIG. 16 is an example of syntactic tree of the above mentioned sentence "This child is smart, he'll do well in life". This syntactic tree is generated as a result of the precise syntactic analysis 140 performed on the graph 1200 of the generalized constituents shown in FIG. 12, and can be represented as a subgraph of the graph 1200 of the generalized constituents, according to one or more embodiments of the invention.

Figure 17:
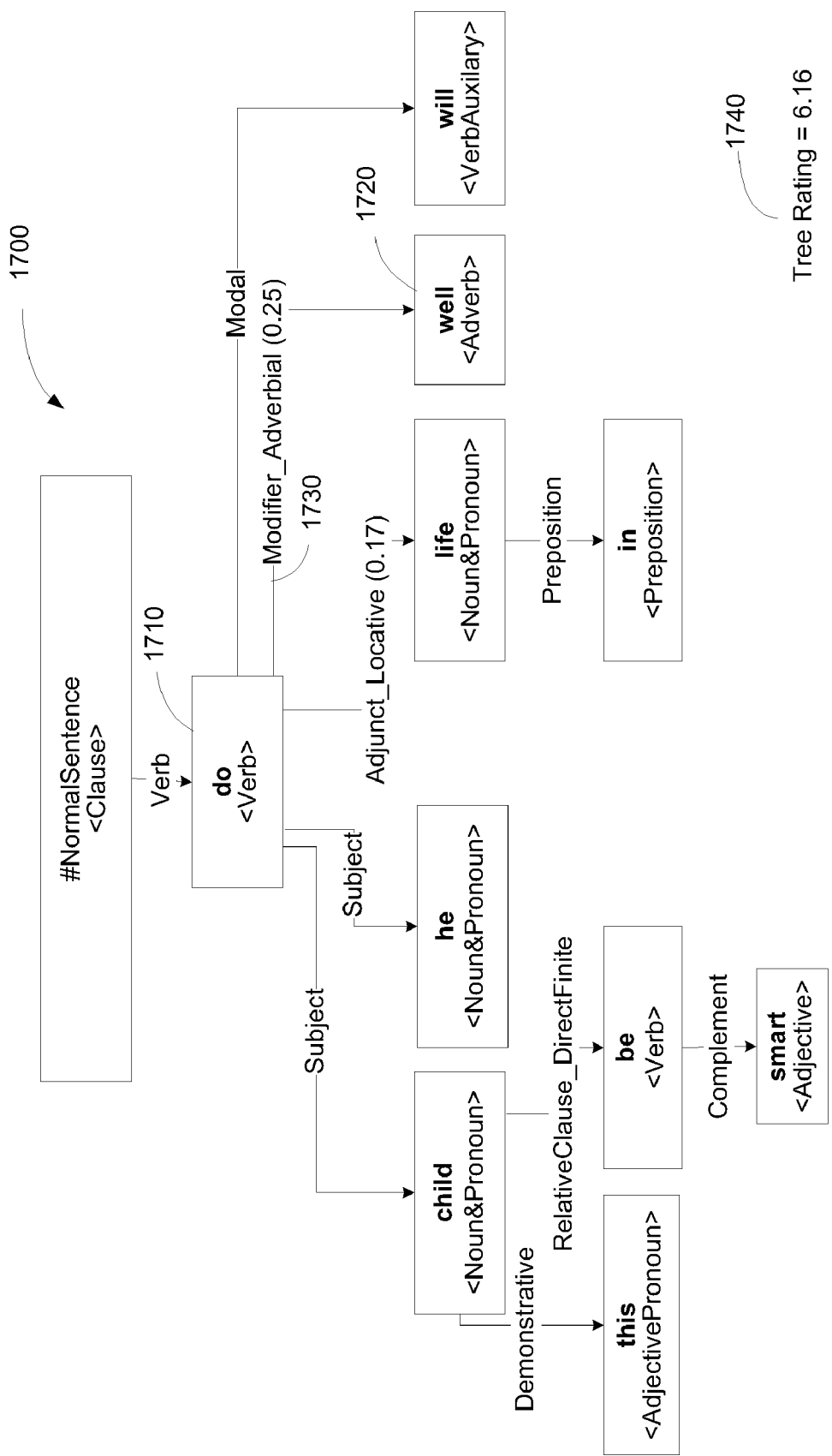
FIG. 17 shows a modified syntactic tree shown on FIG. 16.
Figure 18:
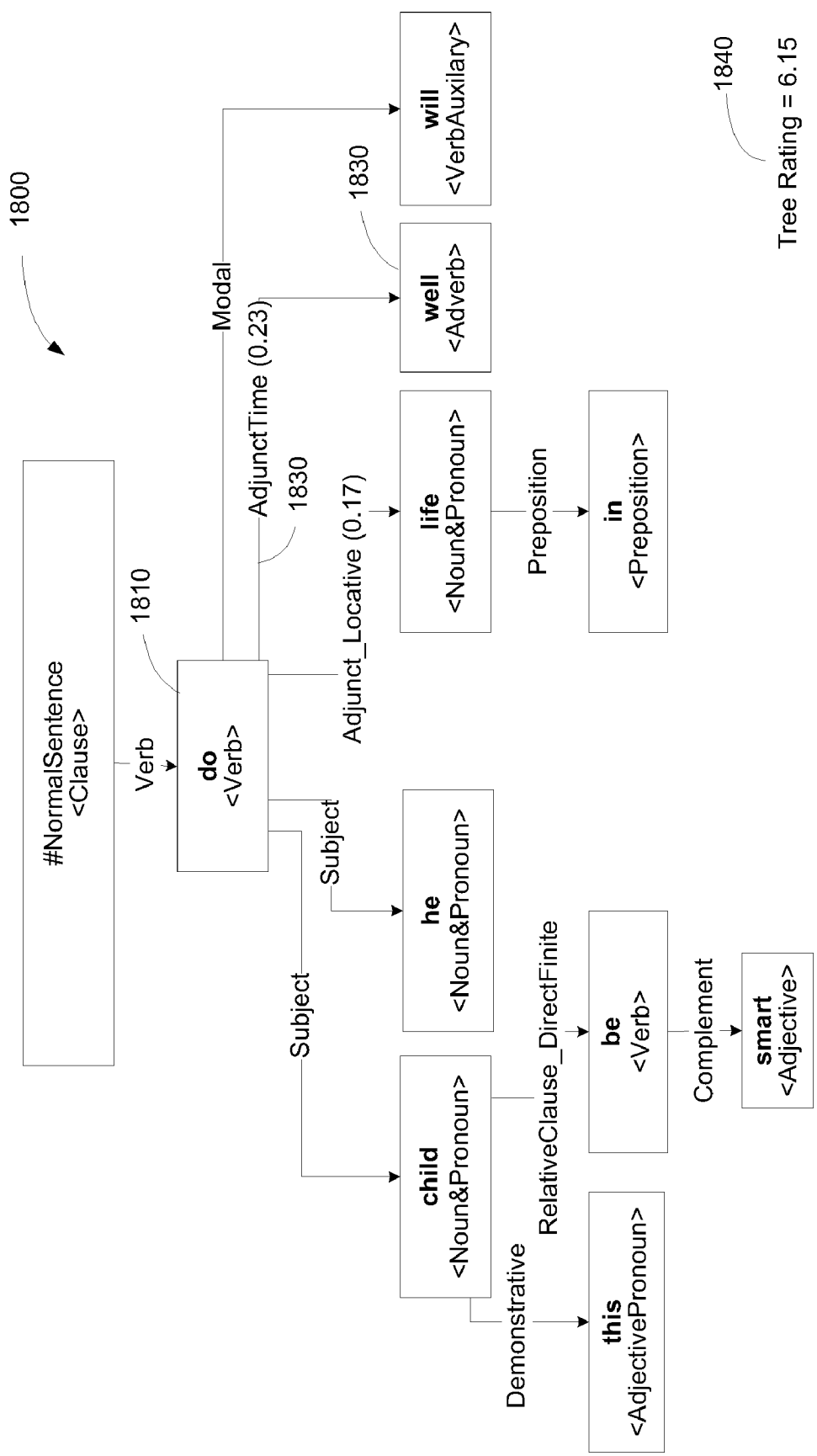
FIG. 18 is another syntactic tree for the exemplary sentence extracted from the graph of generalized constituents from FIG. 12.
Figure 19:
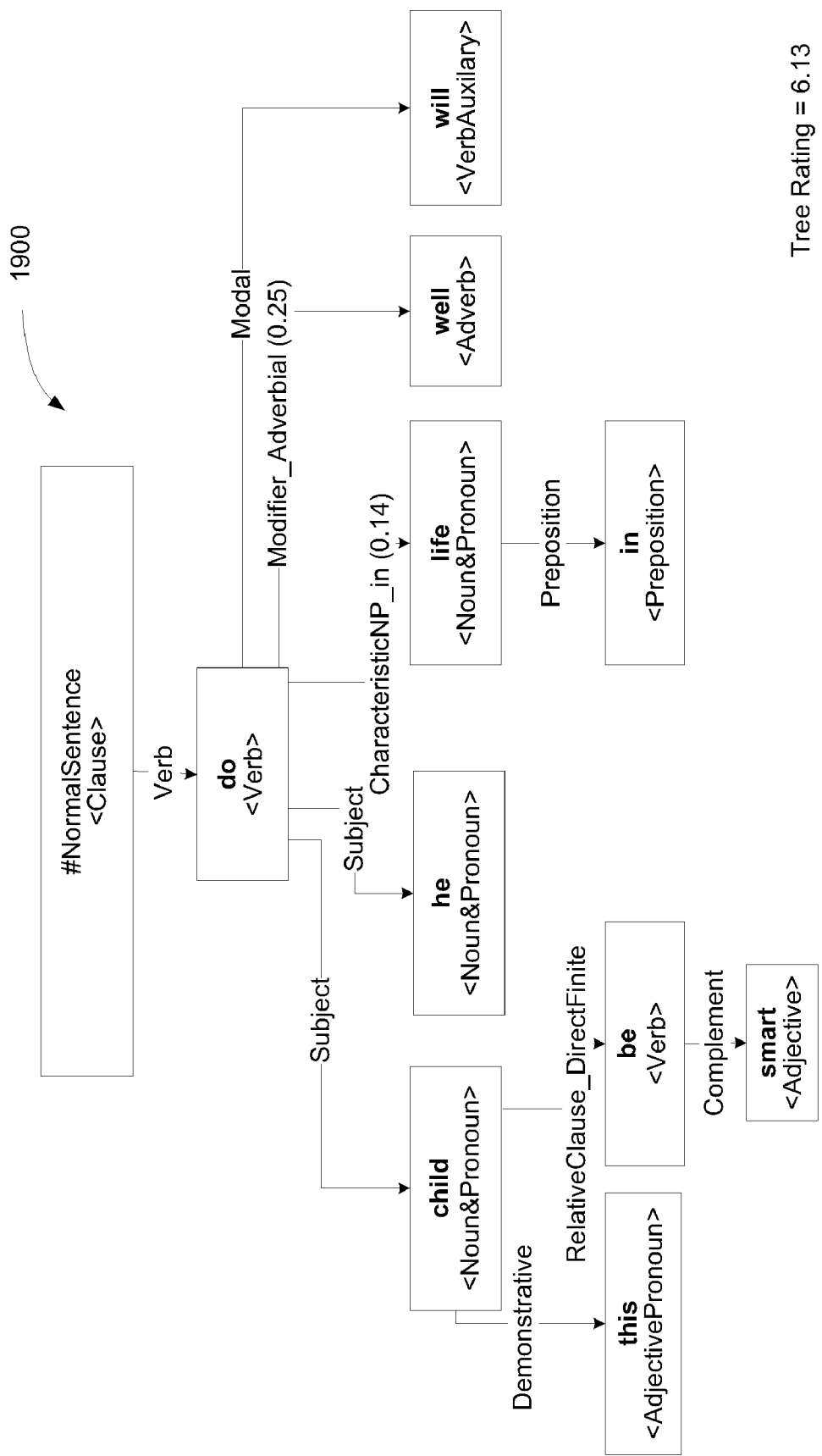
FIG. 19 is still another syntactic tree for the exemplary sentence extracted from the graph of generalized constituents from FIG. 12.
Figure 20:
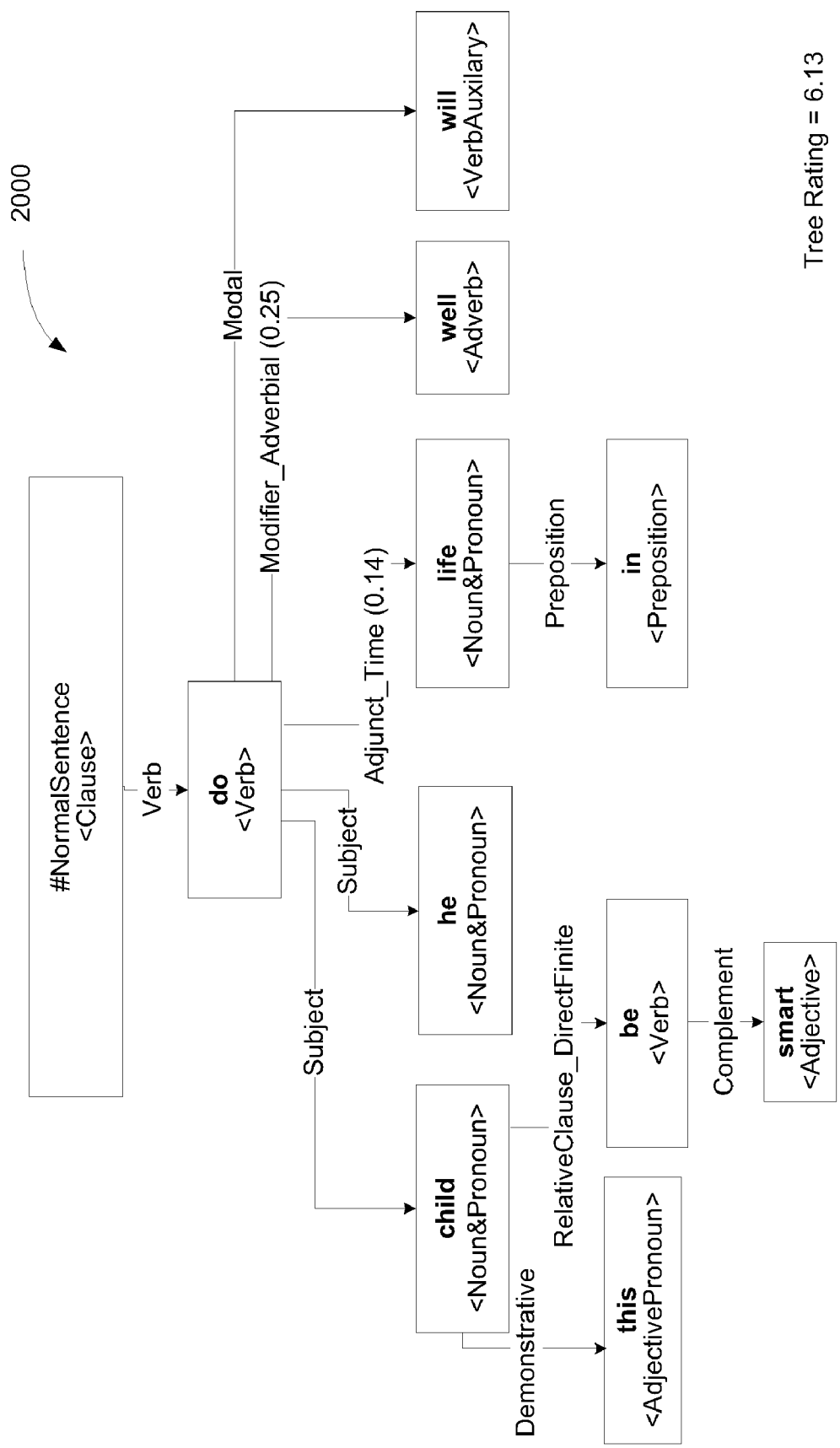
FIG. 20 is still another syntactic tree for the exemplary sentence extracted from the graph of generalized constituents from FIG. 12.
Figure 21:
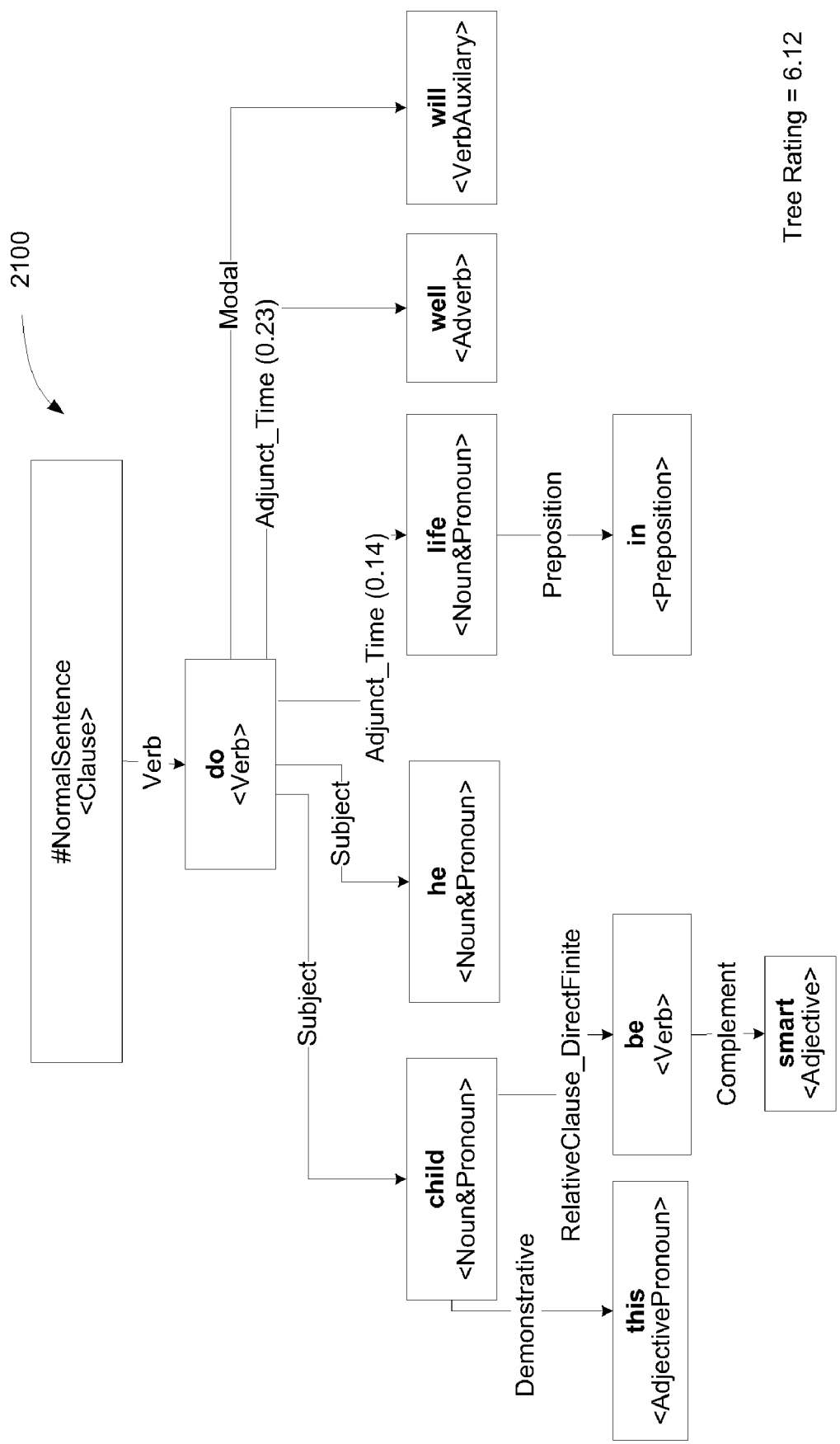
FIG. 21 is still another syntactic tree for the exemplary sentence extracted from the graph of generalized constituents from FIG. 12.
Figure 22:
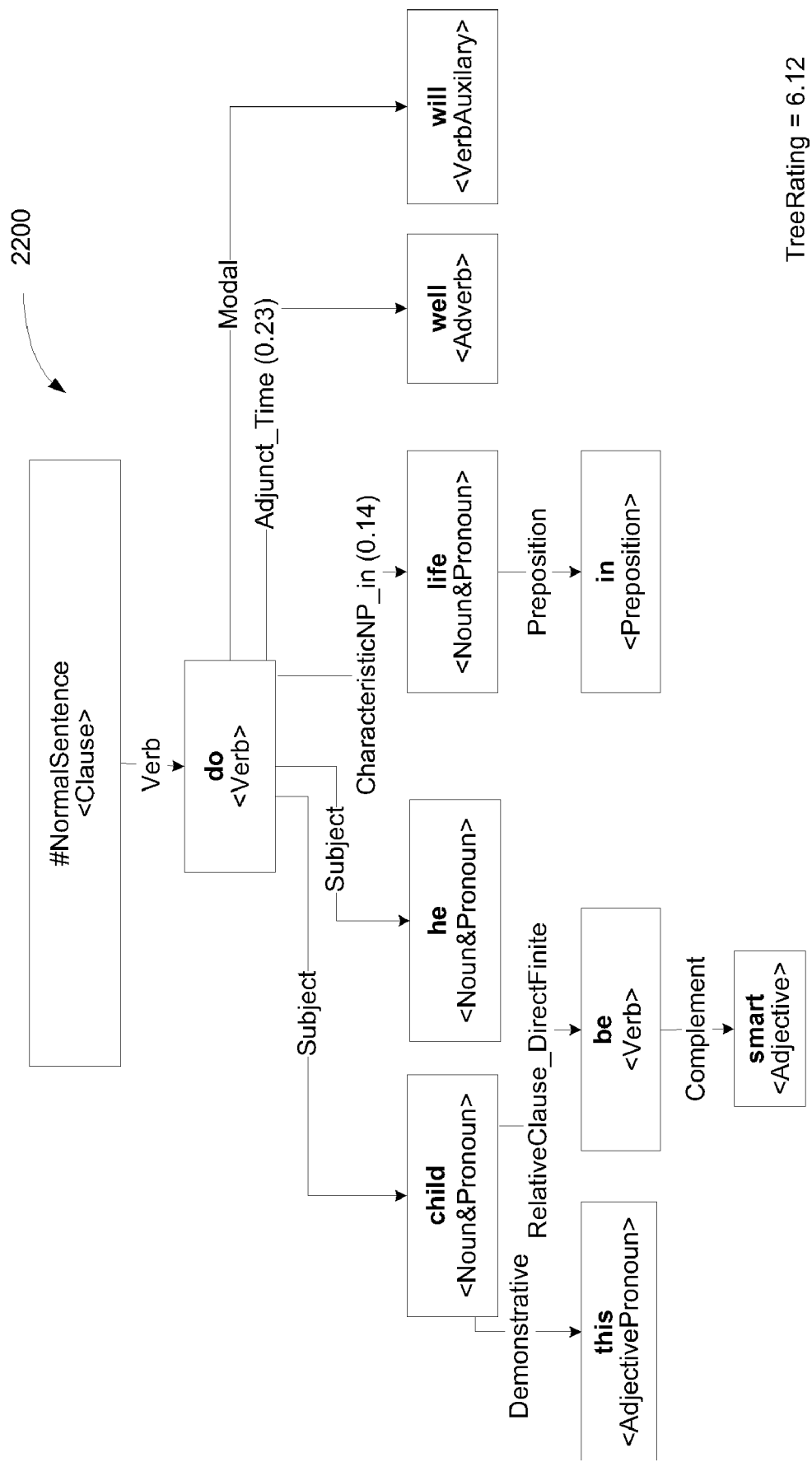
FIG. 22 is still another syntactic tree for the exemplary sentence extracted from the graph of generalized constituents from FIG. 12.

FIG. 17 is the same example of syntactic tree as shown in FIG. 16, but modified into a tree. A rectangle shows a constituent with the selected lexical meaning of the core and its morphological paradigm in broken brackets, for example, Verb or Noun&Pronoun. The root of the syntactic tree 1700 is a particular value #NormalSentence, which serves as a clause value. The arrows are marked by the names of the surface slots, such as Modal, Verb, Subject, Demonstrative, etc., and for some of the surface slots, the corresponding rating scores are shown.

FIGS. 18-23 represent other syntactic trees 1800, 1900, 2000, 2100, 2200, 2300 of best syntactic trees 1420, generated as a result of the stage 1460 for the above mentioned sentence "This child is smart, he'll do well in life". These trees can be generated one after another, as soon as the stage 1470 to generate non-tree links on the previous syntactic tree is unsuccessful. The difference between the syntactic trees 1600, 1700, 1800, 1900, 2000, 2100, 2200, 2300 lie in their structures, filled surface slots for some constituents, and/or the morphological paradigms for some constituents.

For example, the difference between the syntactic tree 1800 and the syntactic tree 1700 generally include the difference in the surface slots filled by the child constituent "well <Adverb>" in the parent constituent "do <Verb>". In the syntactic tree 1700, the surface slot Modifier_Adverbial 1730 is filled by the child constituent 1720 in the parent constituent 1710. The rating score for filling of this surface slot is calculated and amounts to 0.25. In the syntactic tree 1800, the surface slot AdjunctTime 1830 is filled by the child constituent 1820 in the parent constituent 1810 where the constituent 1810 is identical to the constituent 1710 and the constituent 1820 is identical to the constituent 1720. The rating score for filling of this surface slot is calculated and amounts to 0.23. As a result, the tree rating 1740 for the syntactic tree 1700 is about 6.16 and the tree rating 1840 for the syntactic tree 1800 is about 6.15.

During the stage 1470, non-tree links are specified for the best syntactic tree 1420. Since, as a rule, non-tree links appear on the syntactic tree, and it is not a tree anymore, it is called a syntactic structure after the stage 1470. Since many different non-tree links may be specified, several syntactic structures with defined non-tree links, i.e. with a fully-defined surface structure, may be obtained. The stage 1470 may result a syntactic structure 770 with the best rating—the best syntactic structure. During the stage 1470, proforms are inserted into the best syntactic tree 1420, non-tree links are specified, such as by performing ellipsis description 452 and coordination description 454. Additionally, the grammatical agreement between each element of the sentence, which may be as a relationship of control, for example, a controller and a controlled element, using the referential and structural control description 456, is checked. Additionally, syntactic structures 1475 of previous sentences may be used.

Non-tree links are established on the best syntactic tree 1420—the tree of constituents with unambiguously fixed fillers of child slots. However, during the stage 1470, many different non-tree links for the syntactic tree, which may be the best at the current moment, can be generated. Accordingly, several different syntactic structures with non-tree links may be built for each syntactic tree. These syntactic structures or syntactic structure variants generated from different syntactic trees may vary in the inserted proforms, their positions in the tree, and non-tree links. To be able to define an antecedent in the previous text, several of the syntactic structures 1475 of previous sentences from the previous syntactic analysis can be saved. The syntactic structure with the best rating is selected as the best syntactic structure 770. If the stage 1470 is unsuccessful, the returning back 1472 to the stage 1460 is provided to obtain the next-best syntactic tree 1420 with the next value of rating score.

Figure 23:
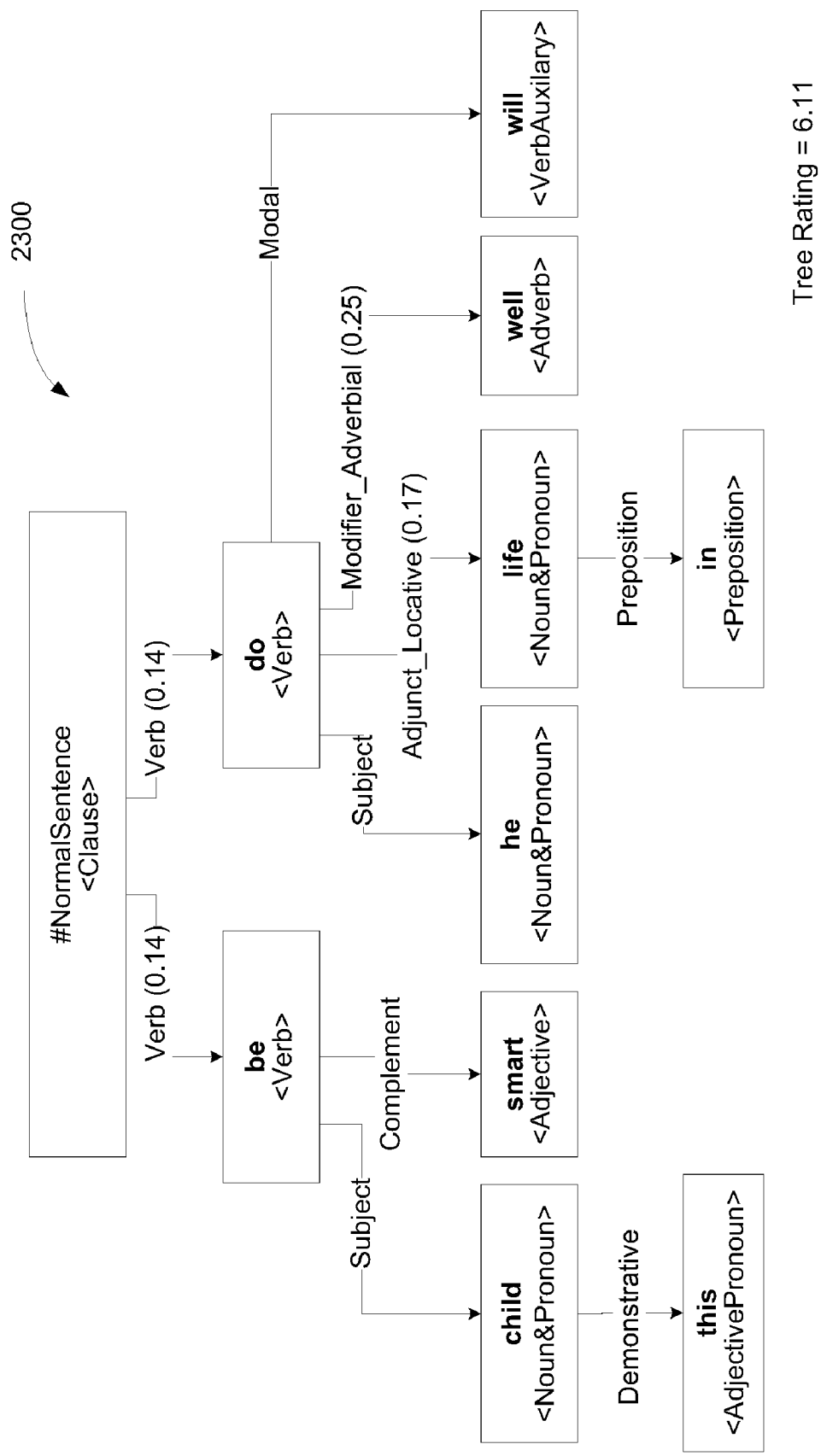
FIG. 23 is a best syntactic tree for the exemplary sentence extracted from the graph of generalized constituents from FIG. 12.
Figure 24:
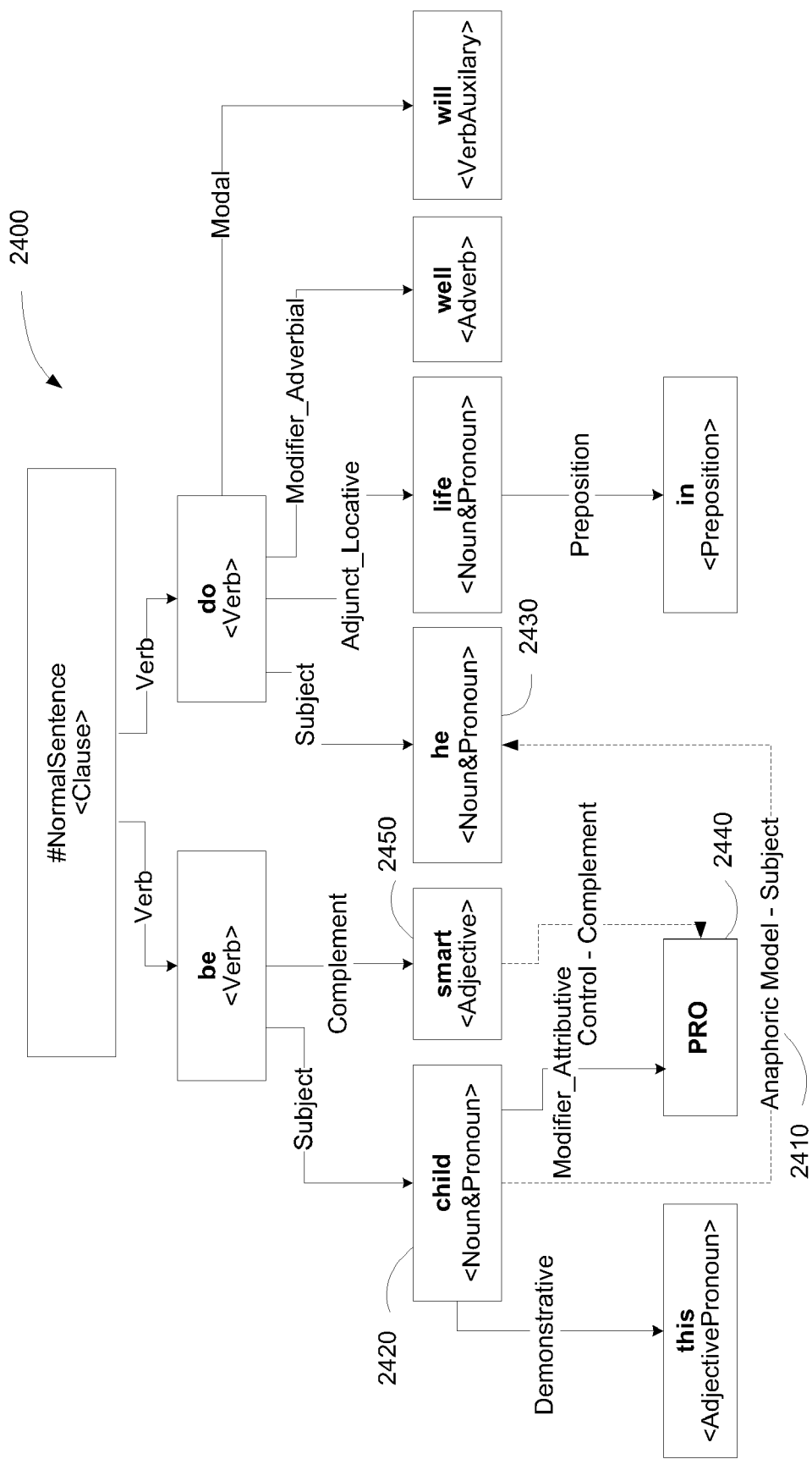
FIG. 24 is an exemplary best syntactic structure for the exemplary sentence with non-tree links generated on the basis of the syntactic tree which is shown on FIG. 23.

FIG. 24 is one example of a best syntactic structure 770, which is obtained near the end of the stage 1470 for the sentence 820 "This child is smart, he'll do well in life". with non-tree links generated on the basis of the syntactic tree which is shown on FIG. 23. A non-tree link of type "Anaphoric Model-Subject" 2410 is established from the constituent "child" 2420 to the constituent "he" 2430 to identify the subjects of the two parts of the complex sentence. Additionally, a proform PRO 2440 is inserted to establish a link between the controller ("child") 2420 and the controlled element ("smart") 2450. As a result, the complement "smart" 2450 fills the surface slot "Modifier_Attributive" 2460 of the controller "child" 2420 by means of a link of type "Control-Complement" 2470.

During the stage 1470, proforms are inserted. For every element of the sentence which can be a controller, its own proform is inserted. If a pronoun (or a proform substituted during the rough syntactic analysis) is controlled, a copy of the pronoun is uniformly made. As a result, every controlled element has a single controller. A controller can have several controlled element variants as different alternatives. Ideally, all available proforms are inserted. However, in the final syntactic tree, there may be only one of the control element variant remained. In addition, the set of meanings for a controlled element may be calculated from the controller; for example, a set of lexical meanings may be taken from the controller, a set of grammatical values may be limited by the agreement rule, etc. In general, the initial mask of a proform results in all the available meanings, whereas the initial mask of a pronoun may permit some meanings, e.g., as restricted by the morphological form of each element of the sentence. For example, after checking with agreement rules, the mask of a pronoun can be empty such that any linking or pairing up between the controller and its proform cannot be established. For example, in some cases, the gender of the controller and the pronoun may not agree; in these cases, only limited numbers of proforms inserted.

At the stage 1470, the possibility to attach the controlled element to the surface slot is determined in a similar way as in attaching a child precise constituent in order to narrow the numbers of the qualified meanings of the controlled element. In general, the parent constituent may be left unchanged for a period of time without changing its grammatical value, and the lexical meaning of the parent constituent may be checked again at a later stage. Similarly, the controller may not be modified until a later stage.

The referential and structural control description 456 contains rules which can generate several alternative controlled elements during the stage 1470. The search for controlled elements can be organized as a call of all the rules in the slots of the syntactic tree which have already been filled. Proforms may be sorted by their quality rating. Proforms which were substituted during the rough syntactic analysis but have not received a controller can be deleted from the syntactic structure.

During the stage 1470, for every syntactic tree, a best syntactic structure with attached non-tree links can be generated, as a result. If no valid non-tree links have been generated, then the syntactic structure of the best syntactic tree 1420 is invalid. In this case, the second-best syntactic tree 1420 may be analyzed. If non-tree links have not been successfully established, a returning back 1472 to the stage 1460 is provided to obtain the next syntactic tree, which may have a different rating score, for generating anther syntactic structure with non-tree links as the best syntactic structure. If none of the returning backs 1462 and 1472 for the precise syntactic analysis 140 is successful, the returning back 734 to the rough syntactic analysis 130 is provided. Additional rough syntactic analysis 130 can be performed with additional consideration of any syntforms which may not have been analyzed previously.

As a result of the rough syntactic analysis 130 and the precise syntactic analysis 140, the syntactic structure with specified surface and deep slots is built. There may be some ambiguity left in grammatical values. The syntactic structure represents a full syntactic analysis of the sentence, indicates its surface and deep slots, and lexical meanings which have been unambiguously selected by this stage. Presence of non-tree links in the sentence determines, in the general case, generation of several different final structures according to different variants of establishing non-tree links. Final syntactic structures are sorted in the order of descending rating.

Figure 25:
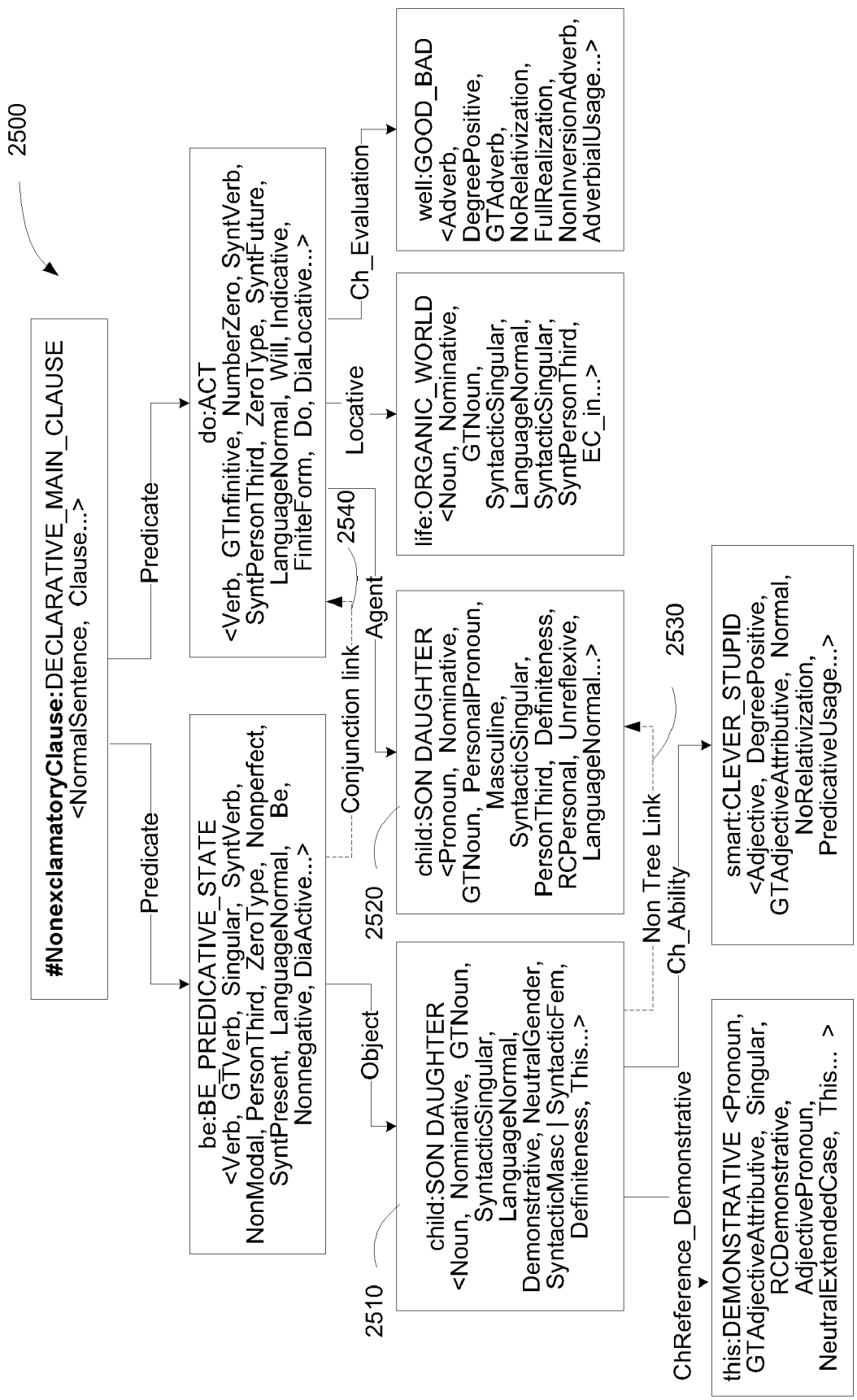
FIG. 25 is one example of the best syntactic structure with semantic parents of lexical meanings and their grammemes generated for the exemplary sentence.

FIG. 25 illustrates a best syntactic structure 2500 generated for the sentence 820 during the precise syntactic analysis 140. The best syntactic structure 2500 contains non-tree links 2530 and 2540, the lexical meanings 612 with semantic classes as their semantic parents (602), and their grammatical values 608. The semantic parents of the lexical meanings are shown by means of a colon and capital letters, for example, "child:SON_DAUGHTER". Grammatical values are displayed in broken brackets. Because the deep slots have already been determined in the end of precise analysis 140, instead of the surface slots the corresponding deep slots are displayed in FIG. 25: Agent, Locative, Agent, etc. To identify the elements "child" 2420 and "he" 2430 by means of the non-tree link 2530, as it was displayed in FIG. 24, the element "child:SON_DAUGHTER" 2510 is copied to the element 2520, keeping the morphological value "Pronoun" in its grammatical value.

Semantic Analysis

As shown in FIG. 7, the semantic analysis 150 is performed after one or more the syntactic trees are formed and the best one with the highest rating score found, a semantic analyzer 742 or its equivalents thereof is adapted to generate a semantic structure 780 using the lexical-semantic dictionary 714, pragmatic context 744, deep models 512, and analysis rules 460. The resulting semantic structure 780 of the source sentence 702 is built from the best syntactic structure 770 according to various applicable analysis rules. Constituents for the semantic structure 780 are constructed by applying diathesis correspondences between the surface (syntactic) and deep (semantic) slots of the constituents from the syntactic structure 770 and by applying the rules of semantic interpretation of the grammatical values of the constituents against a set of sememes of various semantic categories. In one aspect, the semantic structure 780 includes a tree of deep constituents, each deep constituent having one semantic class.

Thus, the language-independent semantic structure 780 is generated during the semantic analysis 150 using the diatheses 417, the deep models 512, the analysis rules 460, the lexical meanings descriptions of the source language as well as pragmatic context (as part of pragmatic descriptions 540). The semantic analysis treats the syntactic structure of a sentence in any language as a surface representation of a language-independent semantic structure.

Figure 26:
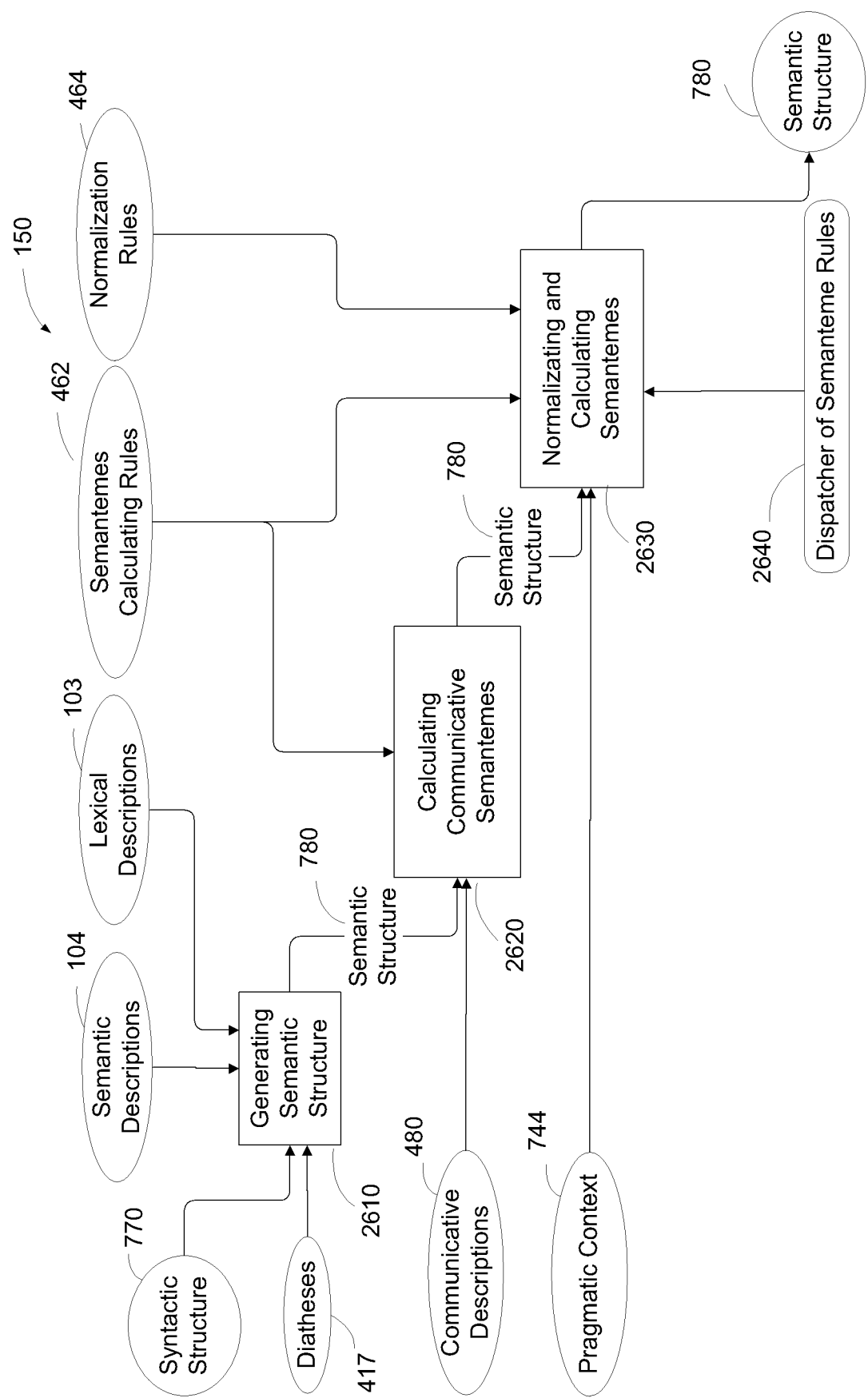
FIG. 26 is a process flow diagram illustrating semantic analyses according to one or more embodiments of the invention.

FIG. 26 is an exemplary process flow diagram illustrating the semantic analysis 150 according to one or more embodiments of the invention. A semantic structure 780 is built from a chosen syntactic structure 770 by performing steps 2610, 2620, 2630 of generating semantic structure, calculating communicative semantemes, and normalizating and calculating semantemes, among others. The syntactic structure 770 as the input data of the semantic analysis 150 may include specified deep slots and selected lexical meanings, the semantic structure 780 may be generated by substituting each lexical meaning in the source language with its language-independent semantic class and then confirming the linear order of the all the lexical meanings. Once the linear order is confirmed, the surface slots can be deleted when generating the semantic structure 780 since only the deep slots 514 and deep slots descriptions, etc., are remained during the building of the semantic structure 780.

During the semantic analysis 150 to transform the syntactic structure 770 into the semantic structure 780, deep correspondences for structural elements of the syntactic structure 770 are established, the grammatical values of the constituents from the syntactic structure 770 are interpreted against semantemes to represent language-independent semantic meanings, each lexical meaning is substituted with its language-independent semantic class, and semantemes with semantic features are generated. The resulting semantic structure 780 is a tree (containing established non-tree links), with language-independent semantic classes as nodes and a set of semantemes and deep slots as branches.

During the step 2610, the semantic structure 780 is generated from the best syntactic structure 770 using the semantic descriptions and the lexical descriptions 103, and the diathesis correspondences 417 between the surface slots 415 and the deep slots 514 for each constituent of the syntactic structure.

At the step 2620, communicative semantemes for constituents in the semantic structure 780 are calculated using semantemes calculating rules 462 and communicative descriptions 480. The semantemes calculating rules 462 can be used to semantically interpret the grammatical values of the constituents against a set of semantemes of various semantic categories. Once the communicative semantemes are calculated at step 2620, all other semantemes can then be calculated, replacing grammemes with the resulting calculated semantemes. The communicative semantemes are used to express the communicative properties of a sentence, such as the standard linear order, the inverse linear order of a relative clause, or the linear order of an interrogative sentence.

At the step 2630 semantemes are then normalized and further calculated. The pragmatic context 744 and the analysis rules 460, such as the semantemes calculating rules 462 and normalization rules 464, may be used during semantemes normalization to remove language asymmetries. The semantic normalization rules 464 are applied to remove language asymmetries. For example, "all of any of the following functions" can be normalized to "all of the following functions". As another example, "each of all of us" can be normalized to "each of us". As still another example, "He can do it, can't he?" can be normalized to "He can do it". ; since the deep slot of TagQuestion is filled, the constituents "can't he" are removed.

The semantic normalization rules 464 are lexicalized and linked to specific semantic classes and lexical meanings. There are two types of the semantic normalization rules 464: rules to be used prior to calculating the semantemes for generating the semantic structure 780; rules to be used after calculating the semantemes. A semantic class is connected with ordered lists of transformation rules of the first and second type. Thus, the semantic normalization rules 464 can be used prior to calculating the semantemes and after calculating the semantemes using the respective semantic normalization rules 464.

In general, rules used during the semantic analysis 150 are applied to the constituents of the semantic structure 780 from the top down, from a parent constituent to child constituents. A constituent is analyzed with rules connected to the semantic class of its core, in the order of description. Rules connected with a certain class are used for all its children. In a child class there is a possibility to re-define inherited rules: add new rules, change the order of application, forbid inherited rules, etc.

The normalization rules 464 are applied to the semantic structure and modify it. Some of the semantemes calculating rules 462 may be used cyclically as long as their conditions are met. Use of semantemes calculating rules 462 leads, in particular, to substitution of language-dependent characteristics, grammemes, with universal characteristics-semantemes.

When the semantemes for different constituents are calculated at the step 2630 of normalizating and calculating semantemes, an additional procedure may be used. A semantemes calculating rule can check the presence of certain semantemes of other constituents. Such a rule can only work after all the semantemes which are specified in this rule have been calculated. To cope with this situation, the rules are started from the child constituents to the parent constituents. If a production refers to constituent semantemes which have not yet been calculated, the rule stops with a special value which says that the rule completion must be postponed. Then a traversal of the tree from the top down is made, starting the rules which were postponed at the first stage. Once again, a traversal of the tree from the child constituents to the parent is made by starting the rest of the postponed rules.

The result of the semantic analysis 150 is the semantic structure 780 of the source sentence built from the best syntactic structure 770 according to rules for the semantic analysis 150. A semantic structure, unlike a syntactic structure, uses universal language-independent concepts and components, such as semantic classes, semantemes, deep slots, among others.

As shown in FIG. 26, a dispatcher 2640 for dispatching semanteme rules is adapted to execute the normalization of the semantic structure 780 and calculating semantemes by applying the analysis rules 460. As a result, every lexical meaning in the semantic structure 780 is substituted with its universal parent—a semantic class. Any possible differences of the child lexical meanings are saved in a list semantemes generated during the application of the analysis rules 460. A description of a constituent in the final semantic structure 780 includes semantic classes which are parents for lexical meanings represented in the best syntactic structure 770, semantemes which are calculated according to the analysis rules 460 or assigned to corresponding parent semantic classes, and child constituents. When there is a link to a child constituent, the deep slot that can be filled is specified. The semantic structure 780 is language-independent and may include, but is not limited to, a tree of deep constituents, deep constituents, and semantic classes which are the fillers of deep slots. Accordingly, the semantic structure 780 can be applied to describe the meanings of a sentence from any natural or artificial languages.

Figure 27:
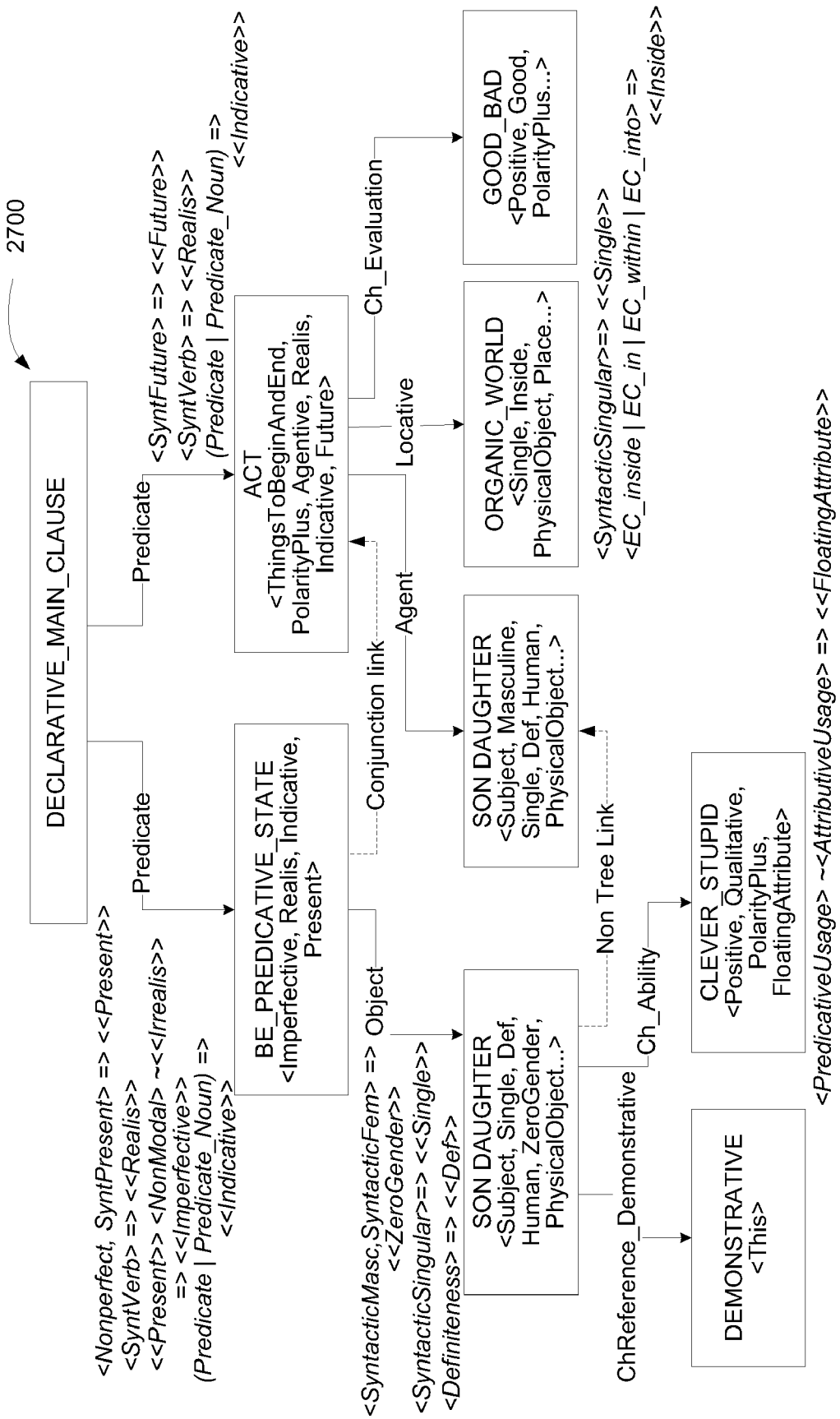
FIG. 27 is an exemplary semantic structure with sememes and exemplary analysis rules according to one or more embodiments of the invention.

FIG. 27 illustrates an exemplary resulting semantic structure 2700 of the sentence 820, "This child is smart, he'll do well in life". The deep constituents are represented by rectangles with a semantic class indicated inside, for example, DECLARATIVE_MAIN_CLAUSE, ACT, GOOD_BAD, etc. The semantemes which are calculated after applying the analysis rules 460 are displayed in broken brackets for each semantic class. For example, <Imperfective, Realis, Indicative, Present> is the semantemes for the semantic class BE_PREDICATIVE_STATE 2740. Some of the applied analysis rules are displayed near rectangles with the semantic class. Deep slots are represented as arrows and named; for example, Object, Agent, Locative, etc. Non-tree links are represented as dotted arrows.

The method and process flow as described herein can be adapted into one or more computer-readable media or one or more algorithms in order to convert a natural-language sentence into its language-independent semantic structure. The one or more computer-readable media or one or more algorithms of the invention can be implemented on one or more analyzers, devices, or computer systems, adapted to perform a single analysis or just a couple of the analyses as described herein and linked together afterward. The algorithm of obtaining the semantic structure is fairly complex, as there are ambiguities at each step, and from a multitude of parsing variants only the most probable one is selected, based on the ratings which take into account semantic, stylistic and pragmatic factors and statistical data. In one aspect, computer-readable media or one or more algorithms may be adapted to perform one or more the lexical-morphological analysis 120, the rough syntactic analysis 130, the precise syntactic analysis 140, and the semantic analysis 150, During each step shown in FIG. 1 and FIG. 7, the user of the computer system can view and select each of the interim and resulting structures. By performing the lexical, morphological and syntactic analyses of a sentence, a syntactic structure as a tree of generalized constituents can be established. The syntactic structure of a sentence is transformed into a semantic structure by semantic interpretation of language-specific elements of the syntactic structure of the sentence and a tree of surface constituents are transformed into a tree of deep constituents and a language-independent semantic structure is formed.

A computer system implemented as a computer program with its own interface or as part of another system in accordance with the method of the invention includes means for entering natural-language text; means for segmenting text into sentences, words, letters, and non-text symbols; means for lemmatization and finding for each source word form a complete set of its grammatical and lexical meanings; means for constructing, in accordance with the model of each lexical meaning, constituents which are the realizations of these models in a given sentence; means for constructing one or more generalized constituents from constituents constructed by using various models available for each lexical meaning of a source word form; means for building a graph of generalized constituents covering all the hypotheses about the possible syntactic structures of the sentence; means for calculating a rough rating of constituents which are included into generalized constituents; means for generating hypotheses about the most probable precise structure of the sentence based on the rough ratings and for selecting the structure with the highest value of the rating; means for calculating the precise ratings for the selected, most probable syntactic structure constituents which are included into generalized constituents; means for establishing non-tree links; means for establishing correspondences for each surface slot of each constituent in the tree of constituents with deep slots; means for calculating the set of sememes of each constituent on the basis of the set of grammemes; means for substituting each lexical meaning in the semantic tree with its language-independent semantic class; means for storing in a database the constructed semantic structure for further use in other applications.

In the computer system, each element of the lexical structure is considered a potential lexical core of the constituent. The means for constructing a constituent may include means for determining all the possible boundaries of the constituents; means for matching the surface models of possible lexical meanings with selected fragments of a given sentence; means for initializing the surface models of possible lexical meanings.

In addition, the means for constructing generalized constituents from constituents constructed by using various models use data about the deep and surface models of the lexical meanings stored in a lexical-semantic dictionary may include means for generalizing surface models; means for generalizing deep models; means for constructing generalized diatheses. The means for building a graph of generalized constituents may include a means for linking the constructed constituents to the surface slots of the parent constituents taking into account the linear word order.

Further, the means for calculating ratings for the selected syntactic structure of a constituent are based on individual ratings of the lexical meanings, ratings of each of the syntactic constructions (e.g., idioms, collocations, etc.) for each element of the sentence, and the degree of conformity of the selected syntactic construction to the semantic descriptions of the deep slots. The means for building a graph of generalized constituents includes means for filtering the constituent models being generalized.

The means for generating hypotheses about the most probable precise structure of the sentence may include means for generating syntactic trees; means for generating the non-tree links; means for verifying the most probable hypothesis by generating specific hypotheses about the structure of dependent constituents; means for choosing the best syntactic structure, i.e. for selecting the tree from the generalized graph. Further, the means for establishing non-tree links for coordination processing, ellipsis, and referential relationships and the means for substituting each lexical meaning in the semantic tree with its language-independent semantic class with registering distinctive semantic features of the lexical meanings. Also, the computer system can implement all the methods, steps, actions automatically.

Embodiments of the invention allow achieving a high accuracy of recognition of the meanings of natural-language sentences, ability to analyze complex language structures, and correct conveyance of information encoded in the sentences. Said effect has been obtained by using exhaustive language descriptions, which include language-independent semantic representations and integral models for describing the syntax and semantics of sentences of various languages. Also, said effect has been obtained by implementation of a two-step analysis algorithm (rough and precise syntactic analyses) which uses the linguistic data of various levels to calculate probability ratings and generates the most probable syntactic structure 770 variants first.

This approach is also different from the known art in that it is based on principles of integral and purpose-driven recognition. This principle consists in that hypotheses about the structure of the part of a sentence are verified within the hypotheses about the structure of the whole sentence. This approach avoids analyzing numerous parsing variants which are known to be invalid.

The invention is superior to the known art as it uses various natural language descriptions which can reflect all the complexities of a language, rather than simplified or artificial descriptions, without the danger of a combinatorial explosion. As result, a generalized data structure, such as a semantic structure, is generated and used to describe the meaning of one or more sentences in language-independent form, applicable to automated abstracting, machine translation, control systems, internet information retrieval, etc.

A typological analysis for the invention was performed for various linguistic families, including Indo-European (Slavic, Germanic, and Romanic languages), Finno-Ugrian, Turkic, Oriental, and Semitic. Embodiments of the invention may be applied to many languages, including, but not limited to, English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Chinese, Arabic, Hindi, Hebrew, Swahili, among others.

While the foregoing is directed to embodiments of the present invention, other and further embodiments of the invention may be devised without departing from the basic scope thereof, and the scope thereof is determined by the claims that follow.

The invention claimed is:

1. A method for a computer to analyze a sentence in a source language, comprising:
    performing a lexical analysis of the sentence in the source language;

performing a lexical-morphological analysis of each element of the sentence and building a lexical-morphological structure for the whole sentence;
performing a rough syntactic analysis on the lexical-morphological structure comprising:
generating all possible constituents for each element of the lexical-morphological structure;
generalizing the constituents to form a set of generalized constituents; and
generating a graph of the generalized constituents to describe all possible syntactic structures of the whole sentence, comprising:
for each generalized constituent having a lexical meaning and grammatical value which corresponds to a connection in the lexical-morphological structure:
initializing a surface model for the generalized constituent;
attempting to attach other constituents in surface slots of the syntforms of the surface model right and left neighboring constituents; and
establishing non-tree links on the graph of the generalized constituents;
performing a precise syntactic analysis to produce one or more syntactic trees for the sentence from the graph of the generalized constituents, the precise syntactic analysis including:
generating a graph of precise constituents, the graph of precise constituents being an intermediate representation between the graph of the generalized constituents and the one or more syntactic trees;
generating one or more syntactic structure variants from the graph of the precise constituents;
rating the precise constituents based on a plurality of rating scores independently obtained and calculated, including rating scores of one or more lexical meanings for each element of the sentence, rating scores of one or more syntactic constructions for each element of the sentence, rating scores of a degree of correspondence of the precise constituents to their semantic descriptions, and rating scores of a linear order of constituents in the sentence;
using the rating of the precise constituents to generate hypotheses about the overall syntactic structure of the sentence; and
selecting one or more hypotheses about the overall syntactic structure of the sentence with a highest rating score from the hypotheses generated;
selecting a best syntactic structure for the sentence from the one or more syntactic trees; and
generating a language-independent semantic structure for the sentence in the source language based at least in part upon the best syntactic structure for the sentence.

2. The method of claim 1, wherein the lexical-morphological analysis further
comprises finding for each element of the sentence a complete set of its grammatical and lexical meanings.

3. The method of claim 1, further comprising:
using one or more morphological descriptions and one or more lexical descriptions of the source language to generate the lexical-morphological structure of the sentence.

4. The method of claim 1, further comprising:
using one or more lexical descriptions, one or more semantic descriptions, and one or more syntactic descriptions to perform the rough syntactic analysis.

5. The method of claim 1, wherein filtering of the constituents is performed prior to and after building the graph of the generalized constituents.

6. The method of claim 1, wherein building the graph of the generalized constituents further comprises performing coordination processing.

7. The method of claim 1, wherein building the graph of the generalized constituents further comprises performing ellipsis restoration.

8. The method of claim 1, further comprising returning back to generating the graph of the precise constituents if the precise syntactic analysis is unsuccessful.

9. The method of claim 1, wherein the precise syntactic analysis further
comprises generating one or more syntactic structure variants with established non-tree links and selecting the best syntactic structure for the sentence from the syntactic structure variants with established non-tree links.

10. The method of claim 1, further comprising returning back to performing the rough syntactic analysis if the precise syntactic analysis is unsuccessful.

11. The method of claim 1, wherein the semantic analysis further comprises:
establishing correspondences between each surface slot of the syntactic structure and deep semantic slot for the sentence using diathesis correspondences;
interpreting a grammatical value for each lexical meaning of the syntactic structures against a set of semantemes;
substituting each lexical meaning with a language-independent semantic class; and
registering distinctive semantic features of each lexical meaning with differentiating semantemes.

12. The method of claim 1, wherein the semantic analysis is performed using pragmatic context.

13. A method of analyzing a sentence in a source language, comprising:
performing a lexical analysis of the sentence in the source language;
performing a lexical-morphological analysis on each element of the sentence and building a lexical-morphological structure for the whole sentence;
performing a rough syntactic analysis on the lexical-morphological structure comprising:
generating all possible constituents for each element of the lexical-morphological structure;
generalizing the constituents to form a set of generalized constituents; and
generating a graph of the generalized constituents to describe all possible syntactic structures of the whole sentence, comprising:
for each generalized constituent having a lexical meaning and grammatical value which corresponds to a connection in the lexical-morphological structure:
initializing a surface model for the generalized constituent;
attempting to attach other constituents in surface slots of the syntforms of the surface model right and left neighboring constituents; and
establishing non-tree links on the graph of the generalized constituents;
performing a precise syntactic analysis on the graph of the generalized constituents, wherein the precise syntactic analysis includes:
rating the graph of the precise constituents based on a plurality of rating scores independently obtained and calculated, including a rating score for one or more lexical meanings for each element of the sentence, a rating score for one or more syntactic constructions for each element of the sentence, a rating score for a degree of correspondence of the precise constituents to their semantic descriptions, and a rating score for the linear order of the constituents;

using the rating scores to generate hypotheses about the overall syntactic structure of the sentence; and selecting one or more best hypotheses about the overall syntactic structure of the sentence with the highest rating score from the hypotheses generated;

generating a graph of precise constituents, the graph of precise constituents being an intermediate re resentation between the graph of the generalized constituents and one or more syntactic trees;

generating one or more syntactic trees from the graph of the precise constituents;

selecting a syntactic structure for the sentence from the one or more syntactic trees;

performing a semantic analysis on the selected syntactic structure of the sentence; and generating a language-independent semantic structure for the sentence of the language based at least in part on the semantic analysis of the selected syntactic structure.

14. The method of claim 13, wherein filtering of the constituents is performed prior to and after building the graph of the generalized constituents.

15. The method of claim 13, wherein building the graph of the generalized constituents further comprises performing coordination processing and ellipsis restoration.

16. The method of claim 1, wherein the source language comprises a natural language selected from the group consisting of English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Chinese, Arabic, Hebrew, and Swahili.

17. The method of claim 13, wherein the precise syntactic analysis further comprises generating one or more syntactic structure variants with established non-tree links and selecting a best syntactic structure for the sentence from the syntactic structures with established non-tree links.

18. A computer readable medium comprising instructions for causing a computing system to carry out steps comprising:

performing a lexical analysis of the sentence in the source language;

performing a lexical-morphological analysis on the each element of the sentence and building a lexical-morphological structure for the whole sentence;

performing a rough syntactic analysis on the lexical-morphological structure of the sentence comprising:

generating all possible constituents for each element of the lexical-morphological structure;

generalizing the constituents to form a set of generalized constituents; and generating a graph of the generalized constituents to describe all possible syntactic structures of the whole sentence, comprising:

for each generalized constituent having a lexical meaning and grammatical value which corresponds to a connection in the lexical-morphological structure:

initializing a surface model for the generalized constituent;

attempting to attach other constituents in surface slots of the syntforms of the surface model right and left neighboring constituents; and establishing non-tree links on the graph of the generalized constituents;

performing a precise syntactic analysis to produce one or more syntactic structures for the sentence from the graph of the generalized constituents;

performing a semantic analysis on the syntactic structures of the sentence and generating a language-independent semantic structure for the sentence.

19. A computer system adapted to analyze a sentence of a language, comprising:

a lexical-morphological analyzer adapted to perform a lexical analysis and a lexical-morphological analysis on each element of the sentence and generate a lexical-morphological structure of the sentence;

a rough syntactic analyzer adapted to perform a rough syntactic analysis on the lexical-morphological structure of the sentence comprising:

generating all possible constituents for each element of the lexical-morphological structure;

generalizing the constituents to form a set of generalized constituents; and generating a graph of the generalized constituents to describe all possible syntactic structures of the whole sentence, comprising:

for each generalized constituent having a lexical meaning and grammatical value which corresponds to a connection in the lexical-morphological structure:

initializing a surface model for the generalized constituent;

attempting to attach other constituents in surface slots of the syntforms of the surface model right and left neighboring constituents; and establishing non-tree links on the graph of the generalized constituents;

a precise syntactic analyzer adapted to perform a precise syntactic analysis on the graph of the generalized constituents and generate a syntactic structure of the sentence from the graph of the generalized constituents, wherein the precise syntactic analysis includes:

rating the graph of the precise constituents based on a plurality of rating scores inde endentl obtained and calculated including a ratin score for one or more lexical meanings for each element of the sentence, a rating score for one or more syntactic constructions for each element of the sentence, a rating score for a degree of correspondence of the precise constituents to their semantic descriptions, and a rating score for the linear order of the constituents;

using the rating scores to generate hypotheses about the overall syntactic structure of the sentence; and selecting one or more hypotheses about the overall syntactic structure of the sentence with the highest rating score from the hypotheses generated; and a semantic analyzer adapted to perform a semantic analysis on the syntactic structure of the sentence and generate a language-independent semantic structure for the sentence of the language.

* * * * *